US012157298B2

(12) United States Patent
Nakaya et al.

(10) Patent No.: US 12,157,298 B2
(45) Date of Patent: Dec. 3, 2024

(54) PRINTING APPARATUS

(71) Applicant: CANON KABUSHIKI KAISHA, Tokyo (JP)

(72) Inventors: Yusuke Nakaya, Tokyo (JP); Ryosuke Sato, Kanagawa (JP); Kenji Sugiyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 149 days.

(21) Appl. No.: 17/948,922

(22) Filed: Sep. 20, 2022

(65) Prior Publication Data

US 2023/0091887 A1 Mar. 23, 2023

(30) Foreign Application Priority Data

Sep. 21, 2021 (JP) ................................ 2021-153617

(51) Int. Cl.
*B41J 11/00* (2006.01)

(52) U.S. Cl.
CPC ................................ *B41J 11/00242* (2021.01)

(58) Field of Classification Search
CPC ............ B41J 11/00242; B41J 11/00212; B41J 13/223; B41J 11/002
See application file for complete search history.

(56) References Cited

U.S. PATENT DOCUMENTS

| | | | |
|---|---|---|---|
| 6,682,189 B2 | 1/2004 | May et al. | |
| 10,479,124 B2 | 11/2019 | Moriguchi et al. | |
| 10,486,417 B2 | 11/2019 | Tsushima et al. | |
| 10,493,782 B2 | 12/2019 | Sato et al. | |
| 10,500,839 B2 | 12/2019 | Sato et al. | |
| 2019/0009600 A1* | 1/2019 | Moriguchi | B41J 2/0458 |
| 2021/0155017 A1 | 5/2021 | Sato et al. | |

FOREIGN PATENT DOCUMENTS

| | | |
|---|---|---|
| JP | 03-3583 B2 | 1/1991 |
| JP | 2003-182064 A | 7/2003 |

* cited by examiner

*Primary Examiner* — Bradley W Thies
(74) *Attorney, Agent, or Firm* — Venable LLP

(57) ABSTRACT

A printing apparatus, which applies ink to a target print medium to form an image by a print unit, includes a plurality of temperature regulation units juxtaposed in a conveyance direction of the target print medium and each configured to regulate a temperature of the target print medium, a plurality of measurement units each configured to measure the temperature of the target print medium, and a control unit configured to make a temperature regulation capability of each temperature regulation unit variable, wherein each temperature regulation unit regulates temperature in a widthwise direction of the target print medium, each measurement unit measures the temperature in the widthwise direction of the target print medium, and the control unit controls the plurality of temperature regulation units based on the measured temperatures.

17 Claims, 15 Drawing Sheets

PRINTING APPARATUS

BACKGROUND OF THE INVENTION

Field of the Invention

The present invention relates to a printing apparatus that prints on a target print medium.

Description of the Related Art

Japanese Patent Laid-Open No. 2003-182064 describes an arrangement in which ink is discharged to an intermediate drum also be referred to as an intermediate transfer member (or simply referred to as a transfer member) by a printhead, an image is formed on the intermediate drum, the image is transferred to a print medium, and the image is thereby printed. Furthermore, Japanese Patent Publication No. 3-3583 describes a heat transfer machine for causing a heated transfer roller to transfer a transfer material by making the transfer material contact a transfer target. According to Japanese Patent Publication No. 3-3583, to suppress a decrease in transfer roller surface temperature caused by contact with the transfer target, a plurality of auxiliary heaters are juxtaposed in the widthwise direction of the transfer roller.

According to Japanese Patent Laid-Open No. 2003-182064, since there is no mechanism for controlling the temperature of the intermediate transfer member, it is easy to receive the influence of disturbance (ambient temperature, ink droplet amount, a difference in heat absorption amount for each ink color, and the like), and it is thus difficult to maintain the temperature of the intermediate transfer member within an appropriate range. According to Japanese Patent Publication No. 3-3583, a decrease in transfer roller surface temperature is suppressed but there is not provided a mechanism for suppressing a decrease in temperature of the transfer material. These may result in deterioration in print quality.

SUMMARY OF THE INVENTION

The present invention has been made in consideration of the above-described problem, and has as its object to provide a technique advantageous in improving print quality.

One of the aspects of the present invention provides a printing apparatus for applying ink to a target print medium to form an image by a print unit, comprising: a plurality of temperature regulation units juxtaposed in a conveyance direction of the target print medium and each configured to regulate a temperature of the target print medium; a plurality of measurement units each configured to measure the temperature of the target print medium regulated by each temperature regulation unit; and a control unit configured to make a temperature regulation capability of each temperature regulation unit variable, wherein each of the plurality of temperature regulation units has a temperature regulation area where temperature regulation of an area in a widthwise direction of the target print medium is performed, each of the plurality of measurement units measures the temperature in the widthwise direction of the target print medium, and the control unit controls the plurality of temperature regulation units based on the temperatures measured by the plurality of measurement units.

Further features of the present invention will become apparent from the following description of exemplary embodiments (with reference to the attached drawings).

DESCRIPTION OF THE EMBODIMENTS

Figure 1:
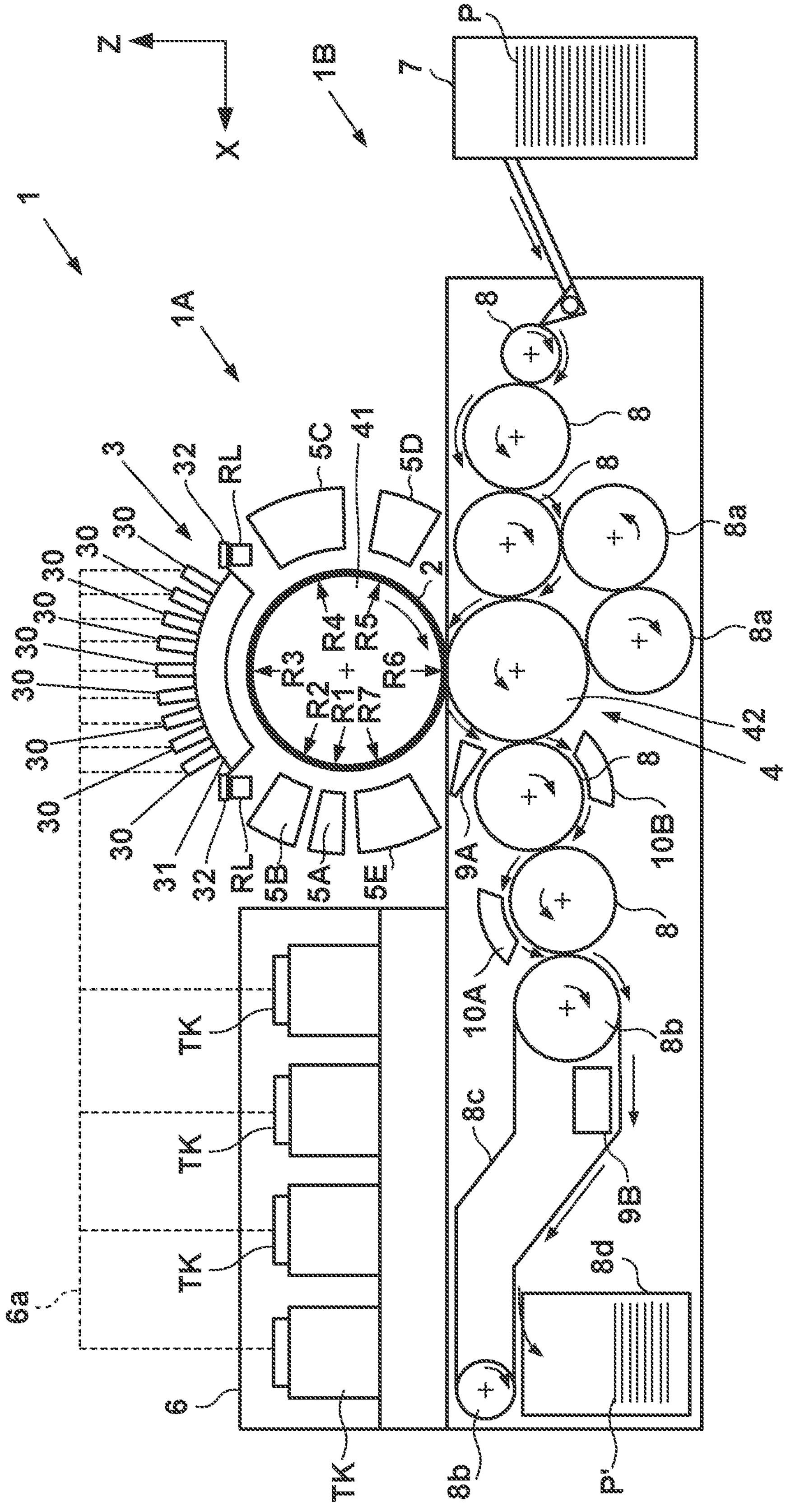
FIG. 1 is a schematic view showing a printing system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

<Printing System>

FIG. 1 shows an example of the arrangement of a printing system (printing apparatus) 1 according to an embodiment. Arrows X, Y, and Z are substantially orthogonal to each other. The arrows X and Y respectively correspond to the left-and-right direction (widthwise direction) and the front-and-rear direction (depth direction) to form the horizontal direction, and the arrow Z corresponds to the up-and-down direction (height direction). This applies to the remaining drawings to be described later.

The printing system 1 is a so-called sheet inkjet printer, includes a printing apparatus 1A and a conveyance apparatus 1B, and forms a printed product P' by transferring an ink image to a print medium P as a cut sheet via a transfer member (target print medium) 2, as will be described in detail later. In this embodiment, the print medium P is conveyed in the X direction. The Y direction corresponds to the widthwise direction of the print medium P or the transfer member 2.

Note that aqueous pigment ink that includes a pigment, water, and a resin can be used as ink but the ink is not limited to this.

<Printing Apparatus>

The printing apparatus 1A includes a print unit 3, a transfer unit 4, peripheral units 5A to 5E, and a supply unit 6.

<Print Unit>

Figure 2:
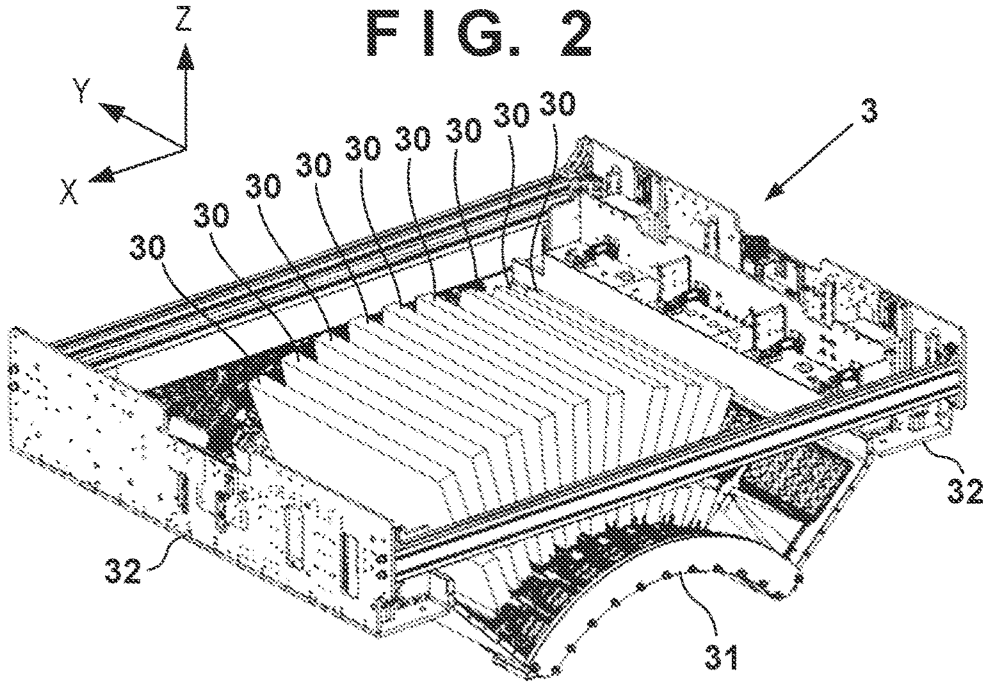
FIG. 2 is a perspective view showing a print unit.

FIG. 2 is a perspective view showing the print unit 3. The print unit 3 includes a plurality of printheads 30, a carriage 31, and a slide portion 32. The printheads 30 discharge liquid ink onto the transfer member 2 and form ink images of a printed image.

Each of the plurality (nine in this embodiment) of printheads 30 is a full-line printhead elongated in the Y direction to be able to discharge ink over the print medium P, and a plurality of nozzles are arrayed in the Y direction on an ink discharge surface. Since the transfer member 2 is formed in a columnar shape, and is configured to rotate about the center axis of the columnar shape, the plurality of printheads 30 are arranged radially to face the surface of the transfer member 2. In this embodiment, the ink discharge surface of each printhead 30 faces the surface of the transfer member 2 via a minute gap (for example, several mm).

Each nozzle includes a discharge element (not shown). The discharge element is configured to, for example, generate a high pressure in the nozzle and discharge ink in the nozzle, and an electrothermal transducer (heater) is used in this embodiment but a piezoelectric element may be used in another embodiment. Alternatively, in still another embodiment, a laser for implementing transfer of the transfer member 2 by static electricity or the like may be used.

The plurality of printheads 30 discharge different kinds of inks. The different kinds of inks are typically inks (for example, yellow ink, magenta ink, cyan ink, black ink, and the like) different in coloring material. That is, one printhead 30 discharges one kind of ink. In another embodiment, one printhead 30 may be configured to discharge the plurality of kinds of inks or some of the printheads 30 may discharge ink (for example, clear ink) that does not include a coloring material.

The carriage 31 fixes the end of each of the plurality of printheads 30 on the side of an ink discharge surface, thereby maintaining the distance between the ink discharge surface and the surface of the transfer member more appropriately. Furthermore, the carriage 31 is configured to be displaceable while mounting the printheads 30 by the guiding of each guide unit RL. In this embodiment, the guide units RL are rail members elongated in the Y direction and provided as a pair separately in the X direction. The slide portions 32 are provided on the two sides of the carriage 31 in the X direction, and engage with the guide units RL to slide by the guiding of the guide units RL in the Y direction.

Figure 3:
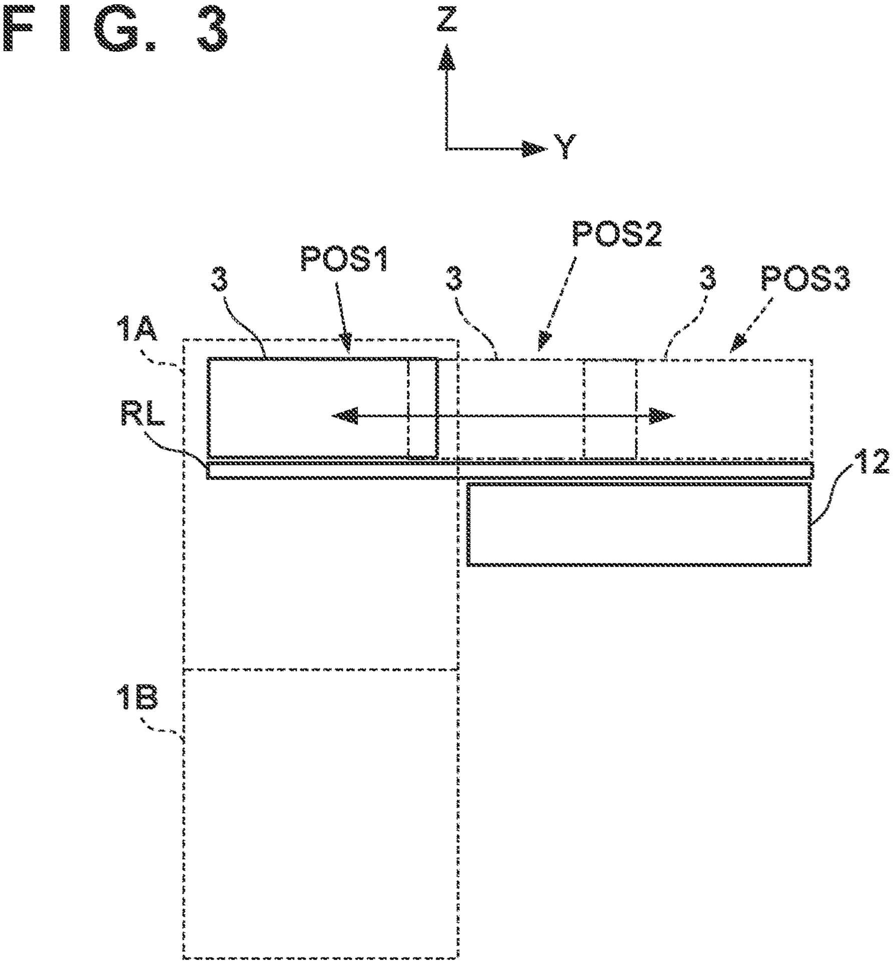
FIG. 3 is an explanatory view showing a displacement mode of the print unit shown in FIG. 2.

FIG. 3 schematically shows the displacement mode of the print unit 3. A recovery unit 12 is provided in the rear of the printing system 1. The recovery unit 12 has a cap mechanism that caps the ink discharge surface of each printhead 30, a wiper mechanism that wipes the ink discharge surface, and a suction mechanism that sucks ink in the printhead 30 by a negative pressure from the ink discharge surface. With this arrangement, the recovery unit 12 recovers the discharge performance of the printheads 30.

The guide unit RL is elongated in the Y direction over the recovery unit 12 from the transfer member 2. By the guide of the guide unit RL, the print unit 3 is displaceable among positions POS1 to POS3. As will be described in detail later, assume that the positions POS1, POS2, and POS3 are the discharge position POS1, the preliminary recovery position POS2, and the recovery position POS3.

At the discharge position POS1, the ink discharge surface of each printhead 30 faces the surface of the transfer member 2 and the print unit 3 can discharge ink to the transfer member 2. At the recovery position POS3, the print unit 3 is located above the recovery unit 12, and the recovery unit 12 executes performance recovery processing on the printheads 30. In this embodiment, at the preliminary recovery position POS2 between the discharge position POS1 and the recovery position POS3 as well, preliminary recovery processing can be performed. For example, the recovery unit 12 can perform preliminary recovery processing on the printheads 30 at the preliminary recovery position POS2 while the printheads 30 move from the discharge position POS1 to the recovery position POS3.

<Transfer Unit>

Referring back to FIG. 1, the transfer unit 4 includes a transfer drum (transfer cylinder) 41 and a pressurizing drum 42. Each of these drums 41 and 42 is a rotating member that rotates about a rotation axis in the Y direction and has a cylindrical shape. Arrows shown in FIG. 1 indicate the rotation directions of these drums 41 and 42. Assume here that the transfer drum 41 rotates clockwise, and the pressurizing drum 42 rotates anticlockwise.

The above-described transfer member 2 is supported by the outer peripheral surface of the transfer drum 41 and is provided on the outer peripheral surface continuously or intermittently. If the transfer member 2 is provided continuously, it is formed into an endless swath. If the transfer member 2 is provided intermittently, it is formed into swaths with ends dividedly into a plurality of segments. The segments are arranged in arc shapes at equal intervals on the outer peripheral surface of the transfer drum 41.

The transfer member 2 moves cyclically in a circular orbit by rotation of the transfer drum 41. Assume here that the transfer member 2 rotates clockwise in FIG. 1. By the rotational phase of the transfer drum 41, the position of the transfer member 2 can be discriminated into processing areas R1 and R2 before discharge, a discharge area R3, processing areas R4 and R5 after discharge, a transfer area R6, and a processing area R7 after transfer. The transfer member 2 passes through the areas R1 to R7 cyclically. As will be described in detail later, the transfer member 2 undergoes predetermined processing by the peripheral units 5A to 5E in the areas R1 and R2, R4 and R5, and R7.

The processing areas R1 and R2 before discharge are areas where preprocessing is performed on the transfer member 2 before the print unit 3 discharges ink. In the processing area R1 before discharge, the peripheral unit 5A performs processing. In the processing area R2 before discharge, the peripheral unit 5B performs processing. Note that when viewed from the direction of the rotation axis of the transfer member 2, the area R1 is located in a portion on one side (in this example, the left portion), and the area R2 is located in an upper portion on one side (in this example, the upper left portion).

The discharge area R3 is an area where the print unit 3 forms an ink image by discharging ink to the transfer member 2. Note that the discharge area R3 is located in an upper portion, and can be provided to be wider than the remaining areas R1, R2, and R4 to R7.

The processing areas R4 and R5 after discharge are areas where processing is performed on the ink image after ink discharge. In the processing area R4 after discharge, the peripheral unit 5C performs processing. In the processing area R5 after discharge, the peripheral unit 5D performs processing. Note that the area R4 is located in an upper portion on the other side (in this example, the upper right portion), and the area R5 is located in a lower portion on the other side (in this example, the lower right portion).

The transfer area R6 is an area where the transfer unit 4 transfers the ink image on the transfer member 2 to the print medium P. Note that the area R6 is located in a lower portion.

The processing area R7 after transfer is an area where post processing is performed on the transfer member 2 after transfer. In the processing area R7 after transfer, the peripheral unit 5E performs processing. Note that the area R7 is located in a lower portion on one side (in this example, the lower left portion).

The transfer member 2 may be formed by a single layer but is preferably a stacked member of a plurality of layers. If the transfer member 2 is formed by the plurality of layers, it may include three layers of, for example, a surface layer, an elastic layer, and a compressed layer. The surface layer is an outermost layer having an image formation surface where the ink image is formed. The compressed layer absorbs deformation and disperses a local pressure fluctuation, thereby maintaining transferability even at the time of high-speed printing. The elastic layer is a layer between the surface layer and the compressed layer.

As a material for the surface layer, a resin, a ceramic, or the like can be used. Alternatively, from the viewpoint of improvement in durability or the like, a material high in compressive modulus, for example, an acrylic resin, an acrylic silicone resin, a fluoride-containing resin, or the like may be used, or a condensate obtained by condensing a hydrolyzable organosilicon compound or the like may be used. The surface layer may undergo a surface treatment to improve wettability of a reactive liquid, the transferability of an image, or the like. Examples of the surface treatment are frame processing, a corona treatment, a plasma treatment, a polishing treatment, a roughing treatment, an active energy beam irradiation treatment, an ozone treatment, a surfactant treatment, a silane coupling treatment, and a combination thereof. An arbitrary surface shape may be provided in the surface layer.

As a material for the compressed layer, acrylonitrile-butadiene rubber, acrylic rubber, chloroprene rubber, urethane rubber, silicone rubber, or the like can be used. When such rubber material is formed, a porous rubber material may be formed by blending a predetermined amount of a vulcanizing agent, vulcanizing accelerator, or the like and further blending a foaming agent, or a filling agent such as hollow fine particles or salt as needed. Thus, the compressed layer is advantageous in improving transferability and durability since it can be compressed along with a volume change in a bubble portion with respect to various pressure fluctuations, and thus deformation in directions other than a compression direction is small. As the porous rubber material, there are a material having an open cell structure in which respective pores continue to each other and a material having a closed cell structure in which the respective pores are independent of each other. However, either structure may be used, or a combination of these structures may be used.

As a member for the elastic layer, a resin, a ceramic, or the like can be used. Alternatively, from the viewpoint of improvement in processing characteristics, an elastomer material, a rubber material, and the like can be used. Examples are fluorosilicone rubber, phenyl silicon rubber, fluorine rubber, chloroprene rubber, urethane rubber, and nitrile rubber. Other examples are ethylene propylene rubber, natural rubber, styrene rubber, isoprene rubber, butadiene rubber, the copolymer of ethylene/propylene/butadiene, and nitrile-butadiene rubber. In particular, silicone rubber, fluorosilicone rubber, and phenyl silicon rubber are advantageous in improving shape stability and durability because of their small compression set. They are also advantageous in further improving transferability because of their small elasticity change caused by a temperature change.

Between the surface layer and the elastic layer and between the elastic layer and the compressed layer, a predetermined adhesive or double-sided adhesive tape can also be used in order to fix them to each other. The transfer member 2 may also include a reinforce layer high in compressive modulus in order to suppress elongation of the transfer member 2 in an axial direction or maintain resilience when attached to the transfer drum 41. Woven fabric can be used as an example. The transfer member 2 is manufactured by arbitrarily combining some of the above-described layers.

The outer peripheral surface of the pressurizing drum 42 is pressed against the transfer member 2. At least one grip mechanism that grips the leading edge portion of the print medium P is provided on the outer peripheral surface of the pressurizing drum 42. A plurality of grip mechanisms may be provided separately in the circumferential direction of the pressurizing drum 42. The ink image on the transfer member 2 is transferred to the print medium P when it passes through a portion (nip portion) clamped or nipped between the pressurizing drum 42 and the transfer member 2 while being conveyed in tight contact with the outer peripheral surface of the pressurizing drum 42.

The transfer drum 41 and the pressurizing drum 42 share a driving source or power source such as a motor that drives them. Power or driving force can be delivered to the transfer drum 41 and the pressurizing drum 42 by a transmission mechanism such as a gear mechanism.

<Peripheral Unit>

Referring to FIG. 1, the peripheral units 5A to 5E are arranged around the transfer drum 41. In this embodiment, assume that the peripheral units are a wax application unit, a reactive liquid application unit, an absorption unit, a heating unit, and a cleaning unit in order. In the following description, the peripheral units 5A to 5E can be expressed as the wax application unit 5A, the reactive liquid application unit 5B, the absorption unit 5C, the heating unit 5D, and the cleaning unit 5E, respectively.

The wax application unit 5A applies a wax onto the transfer member 2 before the print unit 3 discharges ink. The wax is applied to the transfer member 2 so as to at least partially overlap an area where ink is applied. This can form a wax layer on the surface of the transfer member 2. The wax layer is preferably formed over the area corresponding to the print medium P. As will be described in detail later, a wax that is solid at room temperature and changes in phase to a liquid when it is heat-fused is used. Examples of a mechanism capable of applying a wax are a bar coater, a gravure coater, an offset coater, a die coater, a blade coater, a knife coater, or a combination thereof. The wax may be applied to the transfer member 2 using a roller, thereby making it possible to uniformly apply the wax to the area corresponding to the print medium P.

The wax layer formed by applying the wax to the transfer member 2 serves as a release layer for making it easy to peel an image on the transfer member 2. As the wax, a composition obtained by blending a component other than the wax may be used.

In a narrow sense, the wax is an ester of a fatty acid with a higher monohydric alcohol or dihydric alcohol insoluble in water, and includes an animal wax and a vegetable wax but includes no oil or fat. In a broad sense, the wax includes a compound or modification of various waxes such as fat having a high melting point, a mineral-based wax, and a petroleum wax. In this embodiment, the wax in the broad sense can be used without limitation. The wax in the broad sense can be classified into a natural wax, a synthetic wax, or a compound (compound wax) or modification (modified wax) thereof.

Examples of the natural wax are animal waxes (for example, beeswax, spermaceti wax, and wool wax (lanolin)), vegetable waxes (for example, Japan wax, carnauba wax, sugar cane wax, palm wax, candelilla wax, and rice bran wax), mineral-based waxes (for example, montan wax), and petroleum waxes (for example, paraffin wax, micro crystalline wax, and petrolatum). An example of the synthetic wax is a hydrocarbon wax such as Fischer-Tropsch wax and polyolefin wax (for example, polyethylene wax and polypropylene wax). The compound wax is a mixture of some of the above-described waxes. The modified wax is obtained by performing modification processing such as oxidization, hydrogeneration, alcohol denaturant, acrylic denaturant, or urethane modification for some of the above-described waxes. The wax is preferably at least one kind of wax selected from a group consisting of micro crystalline wax, Fischer-Tropsch wax, polyolefin wax, paraffin wax, and modifications thereof.

The wax that is solid at room temperature (25° C.) is used. The wax has more preferably a melting point of 40° C. (inclusive) to 120° C. (inclusive), and still more preferably a melting point of 50° C. (inclusive) to 100° C. (inclusive). The melting point of the wax can be measured by a testing method complying with a predetermined standard (in this example, JIS K 2235: 1991 (petroleum waxes), 5.3.1 melting point testing method). For micro crystalline wax, petrolatum, or a mixture thereof, the melting point can be measured by a testing method described in 5.3.2.

Note that the melting point of the wax is readily influenced by characteristics such as the molecular weight (as the molecular weight is larger, the melting point is higher), the molecular structure (the melting point is high for a straight-chain structure and is low for a branched-chain structure), the crystallinity (as the crystallinity is higher, the melting point is higher), and the density (as the density is higher, the melting point is higher). Therefore, the melting point of the wax is set to a desired melting point by regulating these characteristics.

The reactive liquid application unit 5B applies the reactive liquid onto the transfer member 2 before the print unit 3 discharges ink. The reactive liquid contains a component increasing an ink viscosity. An increase in ink viscosity here means that a coloring material, a resin, and the like that form the ink are made to react chemically or attract physically, thereby increasing the ink viscosity as a whole or partially. As the reactive liquid, another liquid may be used in accordance with the application purpose.

The component that increases the ink viscosity can use a substance (organic acid) such as metal ions or a polymeric coagulant that causes a pH change in ink and coagulates the coloring material in the ink but is not limited to this. Examples of a mechanism that applies the reactive liquid are a roller, a printhead, a die coating apparatus (die coater), and a blade coating apparatus (blade coater). If the reactive liquid is applied to the transfer member 2 before the ink is discharged, it is possible to immediately fix ink adhered to the transfer member 2. This makes it possible to suppress mixing of adjacent inks, that is, so-called bleeding.

The absorption unit 5C absorbs a liquid component from the ink image on the transfer member 2. This can suppress, for example, a blur of an image printed on the print medium P. From another viewpoint, the absorption unit 5C condenses ink that forms the ink image on the transfer member 2. Condensing the ink means increasing the content of a coloring material, a resin, or the like with respect to the liquid component by decreasing the liquid component contained in the ink.

Note that the liquid component is, for example, water, an organic solvent, or the like contained in the ink or reactive liquid, and is not limited to this as long as it has fluidity (has no fixed shape) and an almost constant volume.

The absorption unit 5C includes a liquid absorbing member in this embodiment, and decreases the amount of the liquid component of the ink image by contacting the ink image. The liquid absorbing member may be formed on the outer peripheral surface of the roller or may be formed into an endless sheet-like shape and run cyclically. In terms of protection of the ink image, the liquid absorbing member may be moved in synchronism with the transfer member 2 by making the moving speed of the liquid absorbing member equal to the peripheral speed of the transfer member 2.

The liquid absorbing member may include a porous body that contacts the ink image. The pore size of the porous body on the surface that contacts the ink image may be equal to or smaller than 10 μm in order to suppress adherence of an ink solid content to the liquid absorbing member. The pore size here refers to an average diameter and can be measured by a known measurement method such as a mercury intrusion technique, a nitrogen adsorption method, or an SEM image observation.

The heating unit 5D heats the ink image on the transfer member 2 by radiating radiant heat before transfer from the transfer member 2 to the print medium P. The heating unit 5D heats the ink image to melt a resin in the ink image, thereby making it possible to improve transferability of the ink image to the print medium P. A heating temperature is made equal to or higher than the minimum film forming temperature (MFT) of the resin. The MFT can be measured by a method complying with a standard such as JIS K 6828-2: 2003 or ISO 2115: 1996. From the viewpoint of further improvement of transferability, the heating unit 5D heats the ink image at a temperature higher than the MFT by 10° C. or higher, or more preferably at a temperature higher than the MFT by 20° C. or higher. As the heating unit 5D, a known heating device such as an infrared heater, an infrared lamp, or a warm air fan is used.

The cleaning unit 5E cleans the transfer member 2 after the completion of transfer from the transfer member 2 to the print medium P. The cleaning unit 5E removes ink, wax, reactive liquid, and other residues remaining on the transfer member 2. An example of a cleaning method is a method of executing cleaning by bringing a member made of a material (metal or polyimide-based material) having high surface free energy into contact with the transfer member 2. Alternatively, a known method such as a method of bringing a porous member into contact with the transfer member 2, a method of scraping the surface of the transfer member 2 with a brush, or a method of scratching a residue on the surface of the transfer member 2 with a blade may be used. Note that a known shape such as a roller shape or a web shape can be used for a member for implementing such cleaning.

A cooling unit having the cooling function of the transfer member 2 may be arranged as a peripheral unit in addition to the above-described wax application unit 5A, reactive liquid application unit 5B, absorption unit 5C, heating unit 5D, and cleaning unit 5E. Alternatively, some of the peripheral units 5A to 5E may each additionally have the cooling function. In this embodiment, the temperature of the transfer member 2 rises by heat of the heating unit 5D. If the transfer member 2 whose temperature has risen passes through the print unit 3, heat acts on the printhead 30, thereby degrading ink landing performance or breaking the image film in an excessive dryness state. By cooling the transfer member 2 by the cooling unit to maintain the temperature of the transfer member 2 within a predetermined range, it is possible to appropriately maintain the printing performance of the printhead 30 when the transfer member 2 passes through the print unit 3 and stabilize formation of the image.

Note that the cooling unit may use a mechanism that blows air to the transfer member 2, or a mechanism that brings a member (for example, a roller) into contact with the transfer member 2 and cools the transfer member 2 by air-cooling or water-cooling. The cooling unit may use a mechanism that cools the cleaning member of the cleaning unit 5E. Note that cooling may be performed at an arbitrary timing in a period after the completion of transfer before application of the wax and the reactive liquid.

<Supply Unit>

Referring to FIG. 1, the supply unit 6 supplies ink to each printhead 30 of the print unit 3. The supply unit 6 can be provided on the rear side of the printing system 1. The supply unit 6 includes a plurality of reservoirs TK each of which stores a corresponding kind of ink. Each reservoir TK may be formed by a main tank and a sub tank.

Each reservoir TK and a corresponding one of the printheads 30 communicate with each other by a liquid passageway 6*a*, and ink is supplied from the reservoir TK to the printhead 30. The liquid passageway 6*a* may circulate ink between the reservoirs TK and the printheads 30, and, for example, a pump that circulates ink may be arranged in the middle of the liquid passageway 6*a*. In the middle of the liquid passageway 6*a* or in each reservoir TK, a deaerating mechanism that deaerates bubbles in ink and a valve that regulates the fluid pressure of ink and an atmospheric pressure may be provided. The heights of each reservoir TK and each printhead 30 in the Z direction are designed such that the liquid surface of ink in the reservoir TK is located lower than the ink discharge surface of the printhead 30.

<Conveyance Apparatus>

Referring to FIG. 1, the conveyance apparatus 1B feeds the print medium P before printing to the transfer unit 4 and discharges, from the transfer unit 4, the printed product P' to which the ink image has been completely transferred. The conveyance apparatus 1B includes a feeding unit 7, a plurality of conveyance drums 8 and 8*a*, sprockets 8*b*, a chain 8*c*, and a collection unit 8*d*. The print medium P is conveyed from the feeding unit 7 to the transfer unit 4, and the printed product P' is conveyed from the transfer unit 4 to the collection unit 8*d*.

Note that each arrow shown in FIG. 1 indicates the rotation direction of the element or the conveyance direction of the print medium P or the printed product P'. The side of the feeding unit 7 may be referred to as an upstream side in the conveyance direction (or simply an upstream side), and the side of the collection unit 8*d* may be referred to as a downstream side in the conveyance direction (or simply a downstream side).

The feeding unit 7 includes a stacking unit where the plurality of print media P are stacked and a feeding mechanism that feeds the print media P one by one from the stacking unit to the uppermost conveyance drum 8. Each of the conveyance drums 8 and 8*a* is a rotating member that rotates about the rotation axis in the Y direction and has a cylindrical shape. A grip mechanism that grips the leading edge portion of the print medium P (or printed product P') is provided on the outer peripheral surface of each of the conveyance drums 8 and 8*a*. The grip mechanism controls a gripping operation and release operation such that the print medium P is transferred between the adjacent conveyance drums 8 or 8*a*.

The conveyance drums 8*a* are used to invert the print medium P. In this embodiment, two conveyance drums 8*a* are provided. When the print medium P undergoes double-sided printing, it is not conveyed to the conveyance drum 8 on the downstream side but conveyed to the conveyance drums 8*a* from the pressurizing drum 42 after the completion of transfer onto the surface. In this embodiment, the print medium P is inverted via the two conveyance drums 8*a* and conveyed to the pressurizing drum 42 again via the conveyance drums 8 on the upstream side of the pressurizing drum 42. Thus, the reverse surface of the print medium P faces the transfer drum 41, thereby transferring the ink image to the reverse surface. In this way, double-sided printing of the print medium P is performed.

The two sprockets 8*b* are arranged on the side of the conveyance drums 8 and the side of the collection unit 8*d*, and the chain 8*c* is arranged to run between the sprockets 8*b*, thereby making it possible to convey the printed product P' having undergone printing to the collection unit 8*d*. In this embodiment, one of the sprockets 8*b* is a driving sprocket, and the other sprocket 8*b* is a driven sprocket. The chain 8*c* runs cyclically by rotating the driving sprocket.

The chain 8*c* includes a plurality of grip mechanisms spaced apart from each other in its longitudinal direction. Each grip mechanism grips the end of the printed product P'. The printed product P' is transferred from the conveyance drum 8 on the downstream side to each grip mechanism of the chain 8*c*, and the printed product P' gripped by the grip mechanism is conveyed to the collection unit 8*d* by running the chain 8*c*, thereby releasing gripping at the collection unit 8*d*. Thus, the printed product P' is stacked in the collection unit 8*d*.

<Post Processing Unit>

The conveyance apparatus 1B includes post processing units 10A and 10B. The post processing units 10A and 10B are arranged on the downstream side of the transfer unit 4, and perform predetermined post processing on the printed product P'. The post processing unit 10A performs post processing on the obverse surface of the printed product P', and the post processing unit 10B performs post processing on the reverse surface of the printed product P'. An example of the post processing is coating that aims at protection, providing glossiness, and the like of an image. Examples of coating are liquid application, sheet welding, and lamination.

<Inspection Unit>

The conveyance apparatus 1B includes inspection units 9A and 9B. The inspection units 9A and 9B are arranged on the downstream side of the transfer unit 4, and inspect the printed product P', as follows.

The inspection unit 9A is an image capturing apparatus that captures an image printed on the printed product P' and includes, for example, an image sensor such as a CCD sensor or a CMOS sensor. The inspection unit 9A captures a printed image during a printing operation (during transfer from the transfer member 2 to the print medium P). Based on the image captured by the inspection unit 9A, it is possible to confirm a temporal change in tint or the like of the printed image and determine whether to correct image data or print data. In this embodiment, the inspection unit 9A has an imaging range set on the outer peripheral surface of the pressurizing drum 42 and is arranged to be able to partially capture the printed image immediately after transfer. Note that the inspection unit 9A may inspect all printed images or may inspect some of the images (for example, every predetermined number of sheets).

Similar to the inspection unit 9A, the inspection unit 9B is an image capturing apparatus that captures an image printed on the printed product P' and includes, for example, an image sensor such as a CCD sensor or a CMOS sensor. The inspection unit 9B captures a printed image in a test printing operation. The inspection unit 9B can capture the entire printed image. Based on the image captured by the inspection unit 9B, it is possible to perform basic settings for various correction operations regarding print data. In this embodiment, the inspection unit 9B is arranged to be able to capture the printed product P' conveyed by the chain 8c. When the inspection unit 9B captures the printed image, it captures the entire printed image by temporarily suspending the run of the chain 8c. The inspection unit 9B may be a scanner that scans the printed product P'.

<Control Unit>

Figure 4:
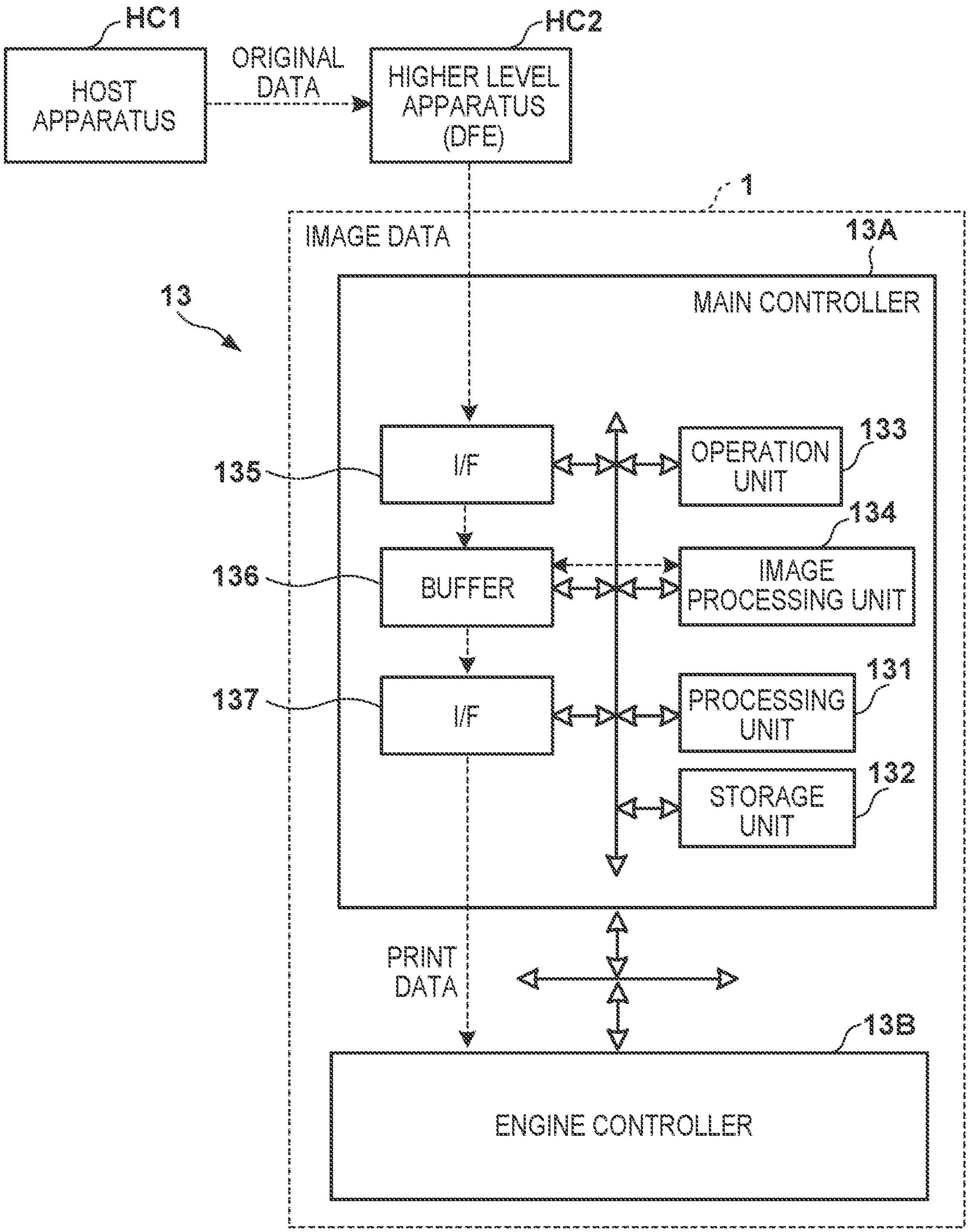
FIG. 4 is a block diagram showing a control system of the printing system shown in FIG. 1.
Figure 5:
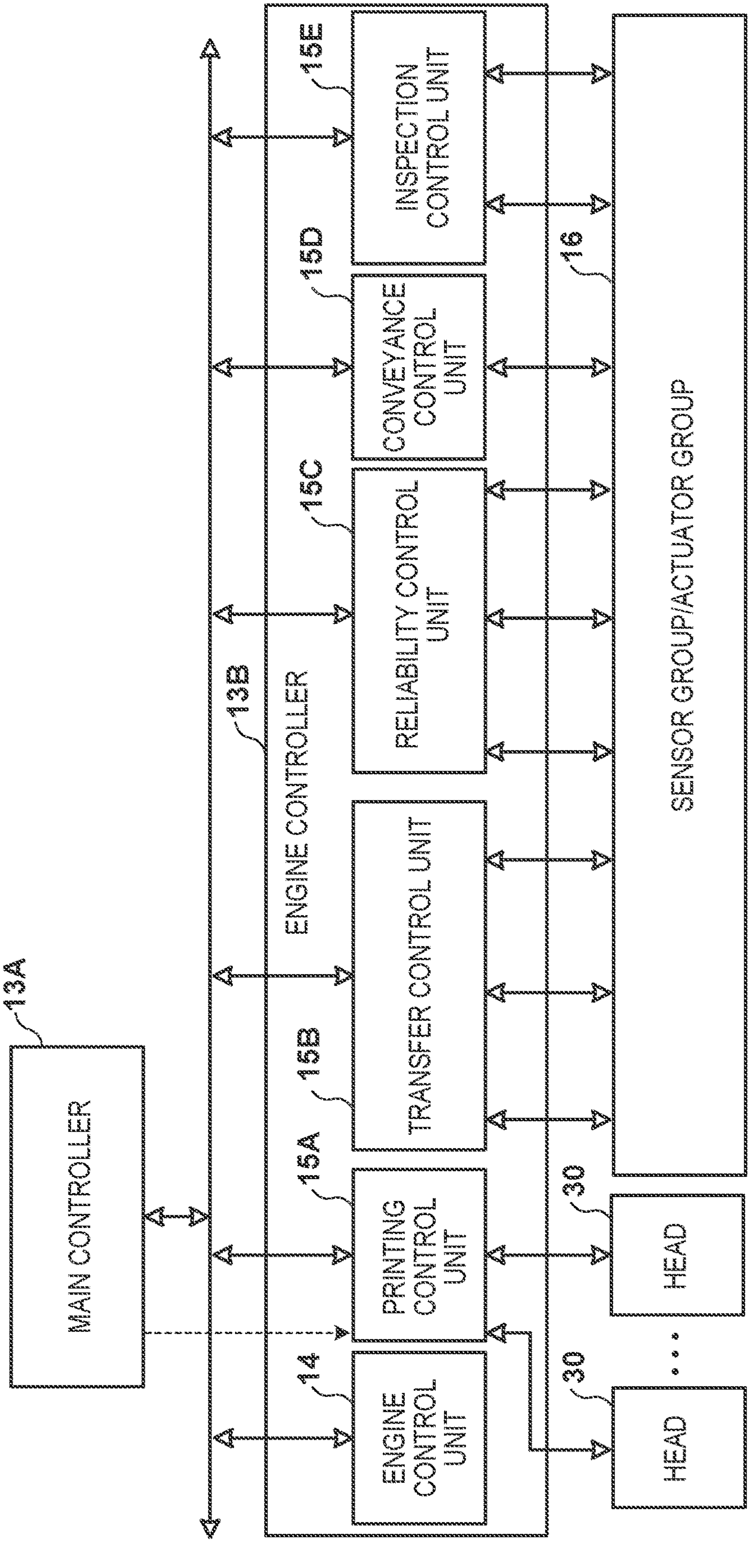
FIG. 5 is a block diagram showing the control system of the printing system shown in FIG. 1.

FIGS. 4 and 5 are block diagrams showing an example of the arrangement of a control unit 13 of the printing system 1. The control unit 13 is communicably connected to a higher level apparatus (DFE (Digital Front End)) HC2, and the higher level apparatus HC2 is communicably connected to a host apparatus HC1.

Original data to be the source of a printed image is generated or saved in the host apparatus HC1. The original data is generated in the format of, for example, an electronic file such as a document file or an image file. The original data is transmitted from the host apparatus HC1 to the higher level apparatus HC2. The higher level apparatus HC2 converts the original data received from the host apparatus HC1 into a data format (for example, RGB data that represents an image by RGB (Red, Green, and Blue)) available by the control unit 13. The converted data is transmitted, as image data, from the higher level apparatus HC2 to the control unit 13. The control unit 13 executes a printing operation based on the image data received from the higher level apparatus HC2.

The control unit 13 is roughly divided into a main controller 13A and an engine controller 13B. The main controller 13A includes a processing unit 131, a storage unit 132, an operation unit 133, an image processing unit 134, a communication I/F (interface) 135, a buffer 136, and a communication I/F 137.

The processing unit 131 functions as a processor including a CPU, reads out and executes programs stored in the storage unit 132, and controls the entire main controller 13A. The storage unit 132 is a storage device such as a RAM (Random Access Memory), a ROM (Read Only Memory), an HDD (Hard Disk Drive), or an SSD (Solid-State Drive). The storage unit 132 stores programs to be executed by the processing unit 131 and data to be used to execute the programs, and provides the CPU 131 with a work area. The operation unit 133 is, for example, an input device such as a touch panel, a keyboard, or a mouse and accepts a user instruction.

The image processing unit 134 is, for example, an electronic circuit including an image processing processor. The buffer 136 is, for example, a RAM, an HDD, or an SSD. The communication I/F 135 communicates with the higher level apparatus HC2, and the communication I/F 137 communicates with the engine controller 13B. Broken-line arrows shown in FIG. 4 exemplify the processing sequence of image data. Image data received from the higher level apparatus HC2 via the communication I/F 135 is accumulated in the buffer 136. The image processing unit 134 reads out the image data from the buffer 136, performs predetermined image processing on the readout image data, and stores the processed data in the buffer 136 again. The image data after the image processing stored in the buffer 136 is transmitted, as print data to be used by a print engine, to the engine controller 13B via the communication I/F 137.

As shown in FIG. 5, the engine controller 13B includes an engine control unit 14, a printing control unit 15A, a transfer control unit 15B, a reliability control unit 15C, a conveyance control unit 15D, and an inspection control unit 15E. Each of these elements 14 and 15A to 15E includes a processor such as a CPU, a storage device such as a RAM or a ROM, and an interface with an external device, thereby implementing a corresponding function (the elements 14 and 15A to 15E will sometimes simply be referred to as control units hereinafter). The engine controller 13B uses the control units 14 and 15A to 15E to acquire detection results of a sensor group/actuator group 16 of the printing system 1 and performs driving control.

Of the sensor group/actuator group shown in FIG. 5, the sensor group includes a sensor that detects the position and speed of a movable part, a sensor that detects a temperature, and an image sensor. The actuator group includes a motor, an electromagnetic solenoid, and an electromagnetic valve.

Note that the division of the functions of the control units 14 and 15A to 15E is an example, and a plurality of control units may be provided to subdivide some control contents or one control unit may be configured to implement the plurality of control contents.

The engine control unit 14 controls the entire system of the engine controller 13B.

The printing control unit 15A converts print data received from the main controller 13A into raster data or the like in a data format suitable for driving of the printheads 30. The printing control unit 15A controls discharge of each printhead 30.

The transfer control unit 15B controls the wax application unit 5A, the reactive liquid application unit 5B, the absorption unit 5C, the heating unit 5D, and the cleaning unit 5E.

The reliability control unit 15C controls the supply unit 6, the recovery unit 12, and a driving mechanism that moves the print unit 3 between the discharge position POS1 and the recovery position POS3.

The conveyance control unit 15D controls driving of the transfer unit 4 and controls the conveyance apparatus 1B.

The inspection control unit 15E controls the inspection units 9B and 9A.

Operation Example

Figure 6:
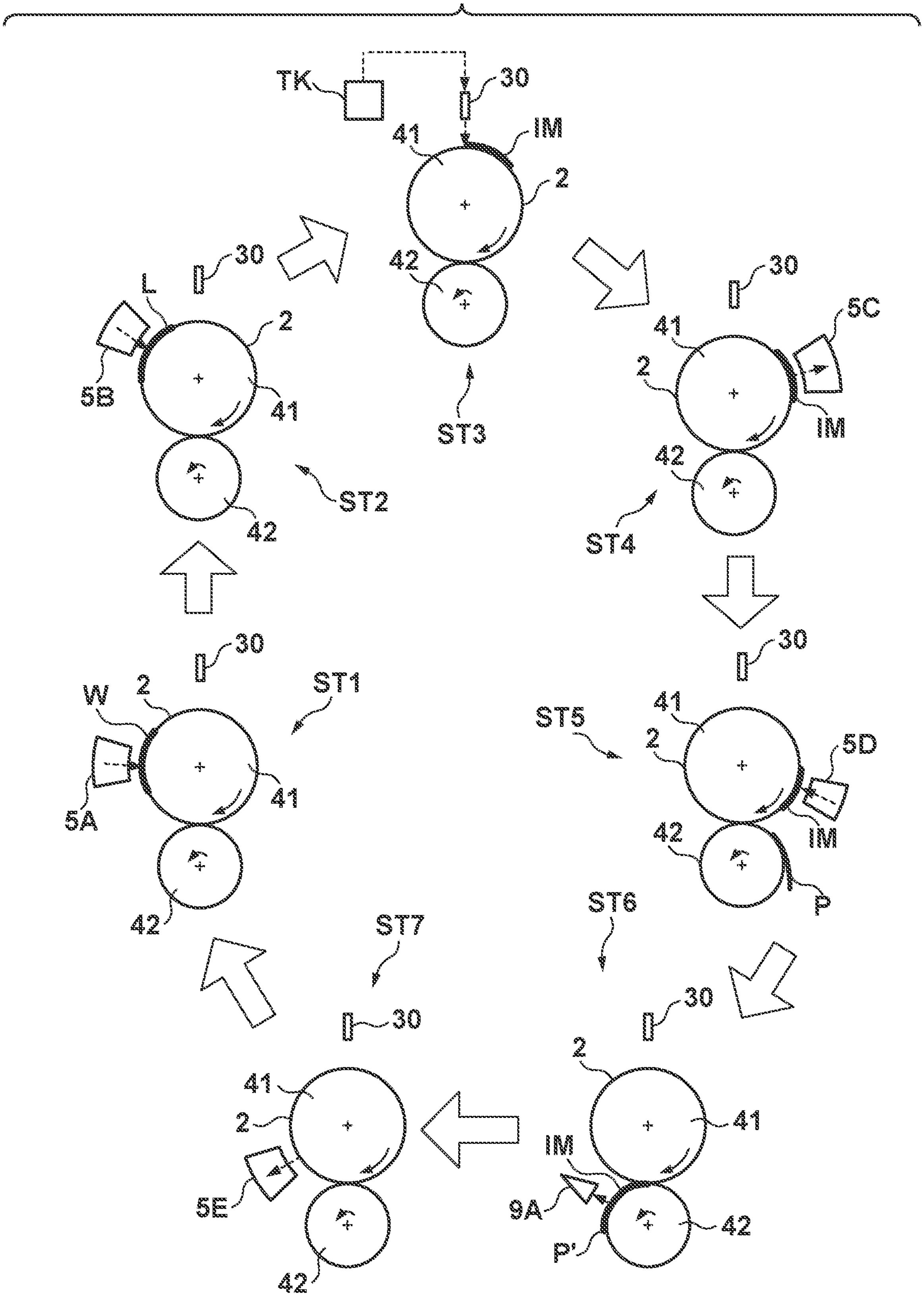
FIG. 6 is an explanatory view showing an example of the operation of the printing system shown in FIG. 1.

FIG. 6 is a schematic view showing some states in a printing operation. Steps indicated by states ST1 to ST7 are performed cyclically while rotating the transfer drum 41 and the pressurizing drum 42.

As shown in the state ST1, first, a wax W is applied from the wax application unit 5A onto the transfer member 2. A portion applied with the wax W on the transfer member 2 moves along with the rotation of the transfer drum 41. When the portion applied with the wax W reaches the reactive liquid application unit 5B, a reactive liquid L is applied from the reactive liquid application unit 5B onto the transfer member 2, as shown in the state ST2. The portion applied with the reactive liquid L on the transfer member 2 moves along with the rotation of the transfer drum 41. When the portion applied with the reactive liquid L reaches under the printhead 30, ink is discharged from the printhead 30 to the transfer member 2, as shown in the state ST3. Thus, an ink image IM is formed. At this time, the discharged ink mixes with the reactive liquid L on the transfer member 2, promoting coagulation of the coloring materials. The discharged ink is supplied from the reservoir TK of the supply unit 6 to the printhead 30.

The ink image IM on the transfer member 2 moves along with the rotation of the transfer member 2. When the ink image IM reaches the absorption unit 5C, as shown in the state ST4, the absorption unit 5C absorbs a liquid component from the ink image IM. After that, when the ink image IM reaches the heating unit 5D, as shown in the state ST5, the heating unit 5D heats the ink image IM, a resin in the ink image IM melts, and a film of the ink image IM is formed. In synchronism with such formation of the ink image IM, the conveyance apparatus 1B conveys the print medium P.

As shown in the state ST6, when the ink image IM and the print medium P reach the nip portion between the transfer member 2 and the pressurizing drum 42, the ink image IM is transferred to the print medium P, and the printed product P' is formed. If the printed product P' passes through the nip portion, the inspection unit 9A captures an image printed on the printed product P' and inspects the printed image. The conveyance apparatus 1B conveys the printed product P' to the collection unit 8*d*. After that, when a portion, on the transfer member 2, where the ink image IM is formed reaches the cleaning unit 5E, it is cleaned by the cleaning unit 5E, as shown in the state ST7.

From the state ST1 to the state ST7, the transfer member 2 rotates once, and transfer of the ink image to the print medium P is performed repeatedly in the same procedure. The form in which transfer of the ink image IM to one print medium P is performed once in one rotation of the transfer member 2 has been explained above for easy understanding. However, it is possible to continuously perform transfer of the ink image IM to the plurality of print media P in one rotation of the transfer member 2.

Figure 7:
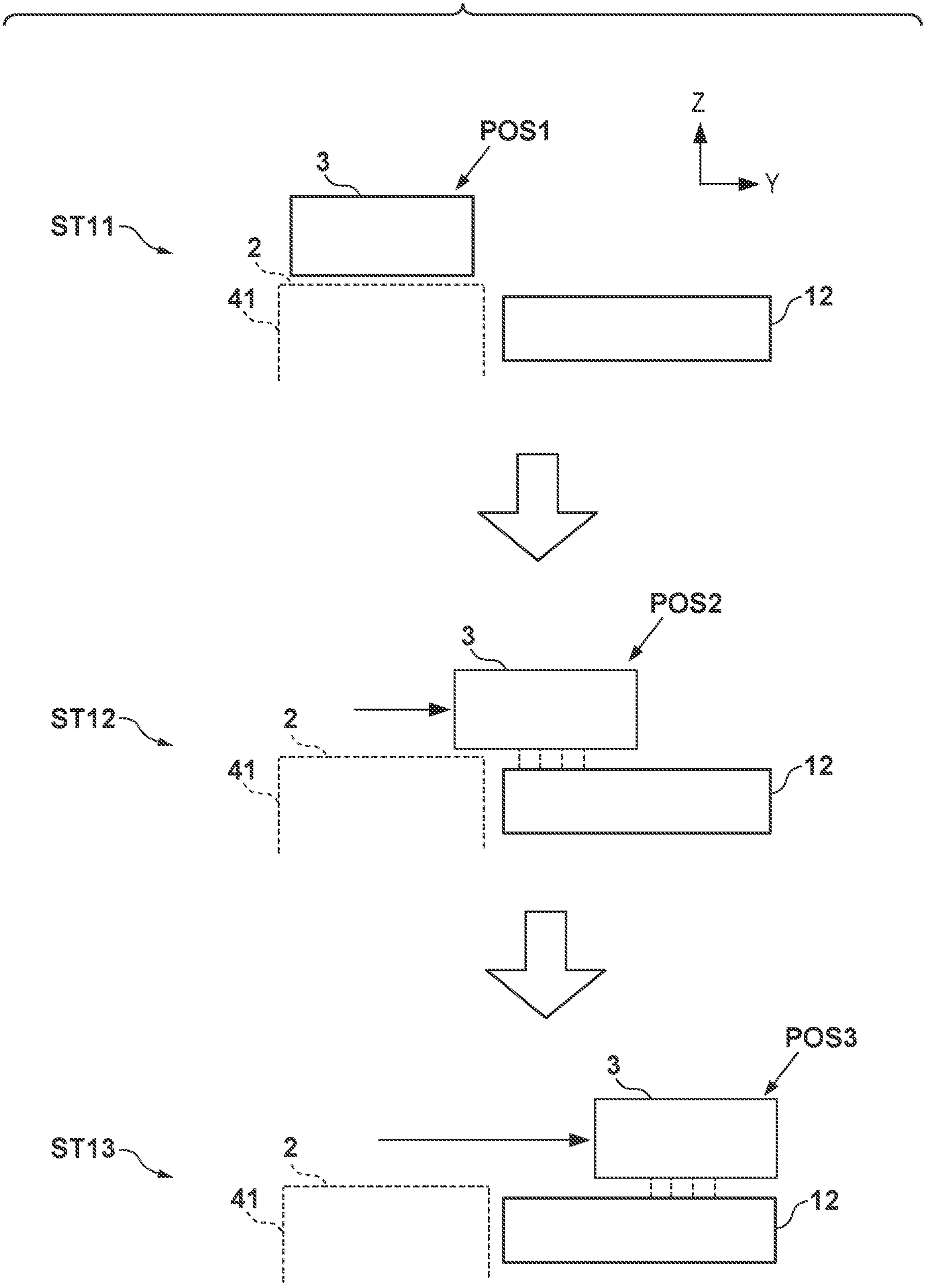
FIG. 7 is an explanatory view showing an example of the operation of the printing system shown in FIG. 1.

As shown in FIG. 7, if the above-described printing operation continues, each printhead 30 needs maintenance. A state ST11 shows a state in which the print unit 3 is located at the discharge position POS1. A state ST12 shows a state in which the print unit 3 passes through the preliminary recovery position POS2. In this state, under passage, the recovery unit 12 executes processing of recovering discharge performance of each printhead 30 of the print unit 3. Subsequently, as shown in a state ST13, the recovery unit 12 executes the processing of recovering the discharge performance of each printhead 30 in a state in which the print unit 3 is located at the recovery position POS3.

<Temperature Control of Transfer Member>

Figure 8:
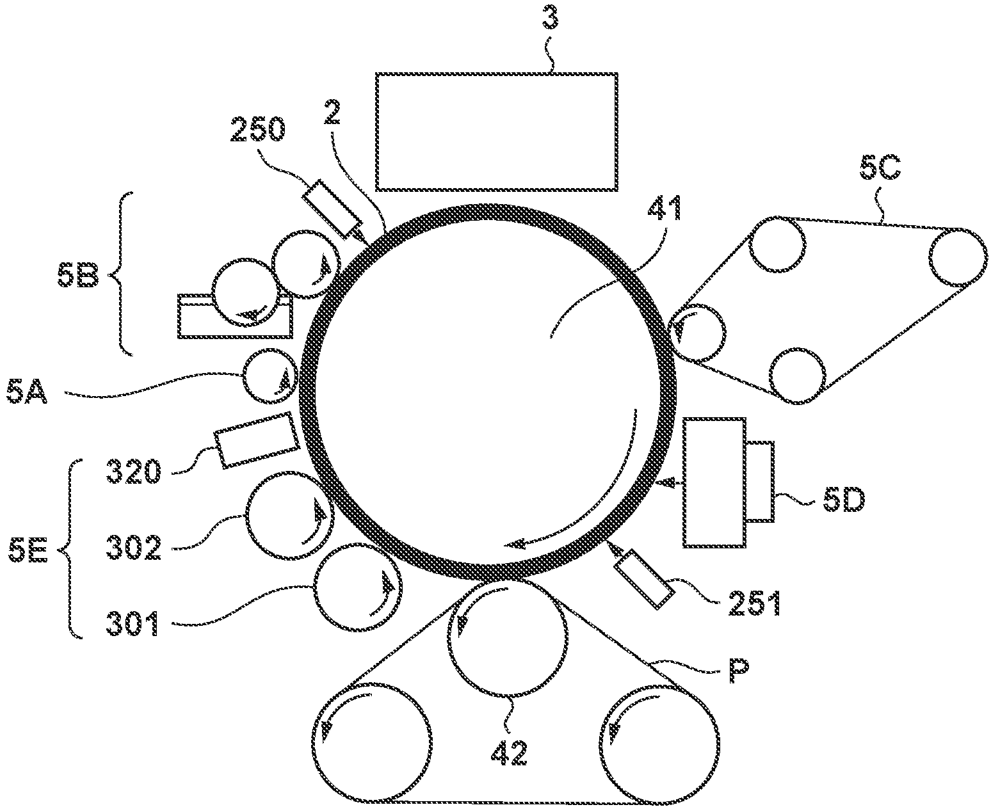
FIG. 8 is a schematic view showing components that execute temperature control of a transfer member.

FIG. 8 schematically shows the transfer member 2 and its peripheral components used to execute temperature control of the transfer member 2. Note that among the components of the printing system 1 shown in FIG. 1, components that are not directly related to the temperature control of the transfer member 2 are not illustrated in FIG. 8.

As shown in FIG. 8, in the rotation direction of the transfer member 2, a temperature sensor 250 is provided on the downstream side of the reactive liquid application unit 5B, and a temperature sensor 251 is provided on the downstream side of the heating unit 5D. By arranging the temperature sensors 250 and 251 at two locations with respect to the rotation direction in this way, the temperature of the transfer member 2 cooled by the cleaning unit 5E and/or the wax application unit 5A is detected, and the temperature of the transfer member 2 heated by the heating unit 5D is also detected. As each of the temperature sensors 250 and 251, a non-contact sensor that can measure the temperature of the transfer member 2 by detecting infrared rays radiated from the surface of the transfer member 2 can be used.

With this arrangement, while the temperature of the transfer member 2 is maintained or kept to fall within a range of T1 to T2 [° C.] immediately below the print unit 3, the temperature of the transfer member 2 is maintained or kept to fall within a range of T3 to T4 [° C.] in the nip portion between the transfer drum 41 and the pressurizing drum 42 in which the image is transferred.

Figure 9:
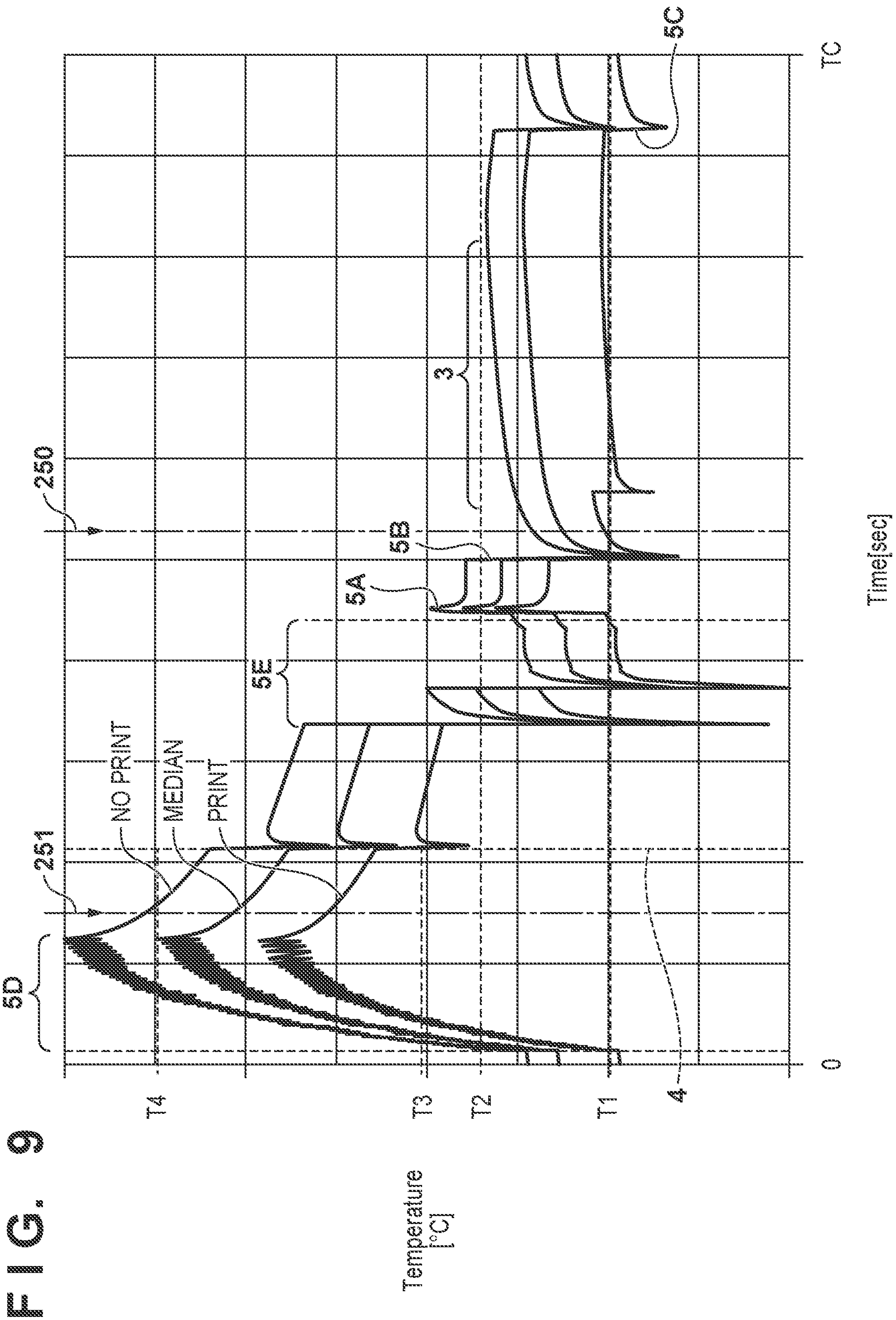
FIG. 9 is a timing chart showing a temporal change in surface temperature of the transfer member.

FIG. 9 is a timing chart showing a temporal change in surface temperature of the transfer member 2. The transfer member 2 performs the above-described printing operation while rotating at such rotation speed that one rotation is done in TC sec. FIG. 9 exemplifies how the surface temperature changes while a given point on the surface of the transfer member 2 rotates once. FIG. 9 shows a temperature profile of an area (printed) where there is the ink image IM on the transfer member 2, an area (non-printed) where there is no ink image IM, and the median (the median of the surface temperature of the transfer member 2) of the temperatures. Such temperature profile that the origin (0 sec) of the time axis is set as a start point and a rotation ends after TC sec to return to the start point is repeated.

Control for preferably maintaining the in-plane temperature of the transfer member 2 in the printing system 1 having the above arrangement will be described below.

<Heating Unit>

Figure 10:
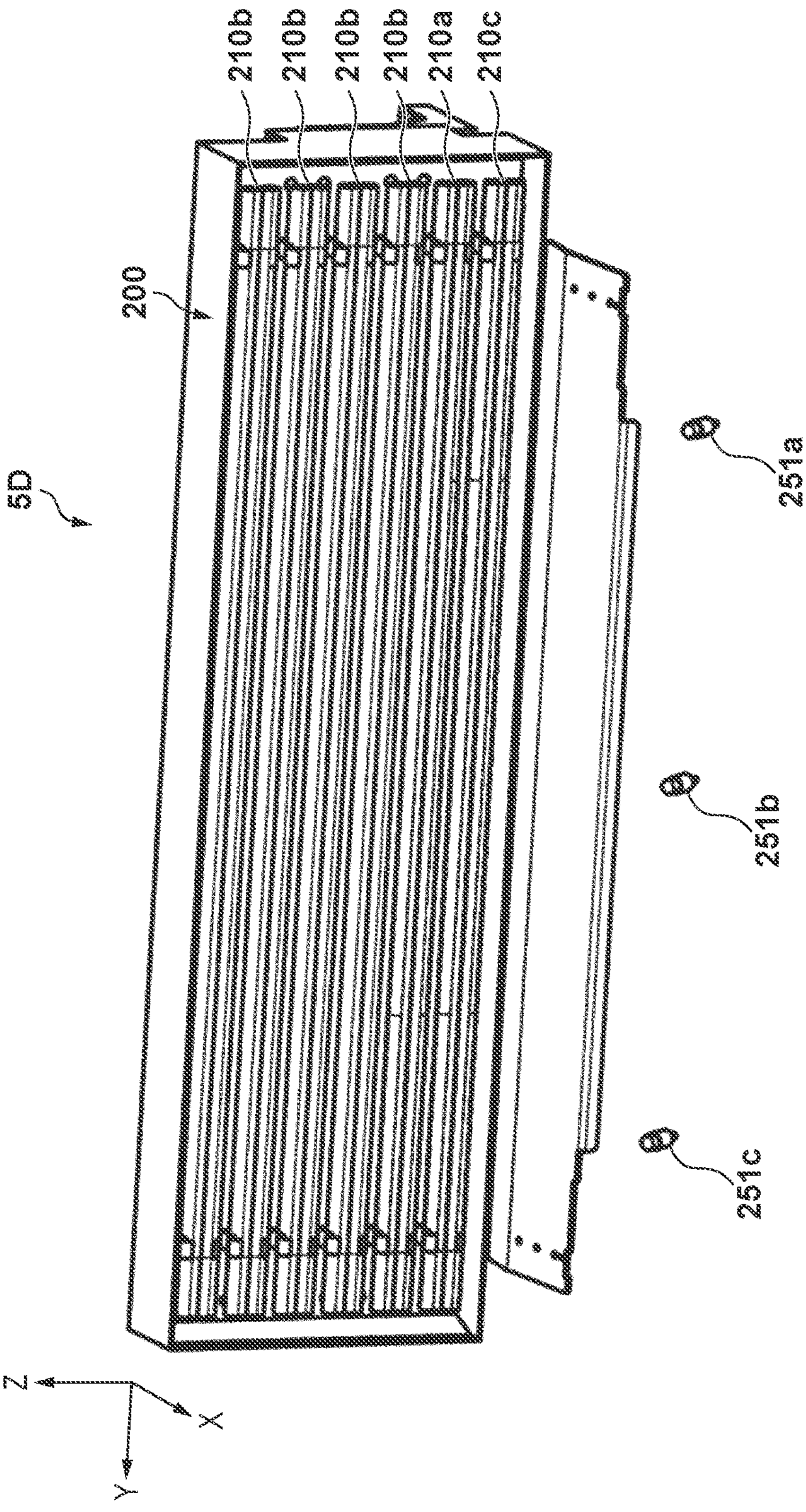
FIG. 10 is a perspective view showing a heating unit.

FIG. 10 is a perspective view showing the heating unit 5D. The heating unit 5D includes a heating housing 200 and a plurality of heaters 210. An infrared heater is used as the heater 210, and six infrared heaters are juxtaposed in the rotation direction (in the −Z direction in FIG. 10) of the transfer member 2. Each heater 210 has a heating range that covers the width of the image printing area of the print medium having a usable maximum size. The heaters 210 are divided into a plurality of types of heaters 210*a* to 210*c*, and are configured to execute heating control independently for each type (to be simply referred to as the heaters 210 hereinafter when they need not particularly be discriminated).

Figure 11:
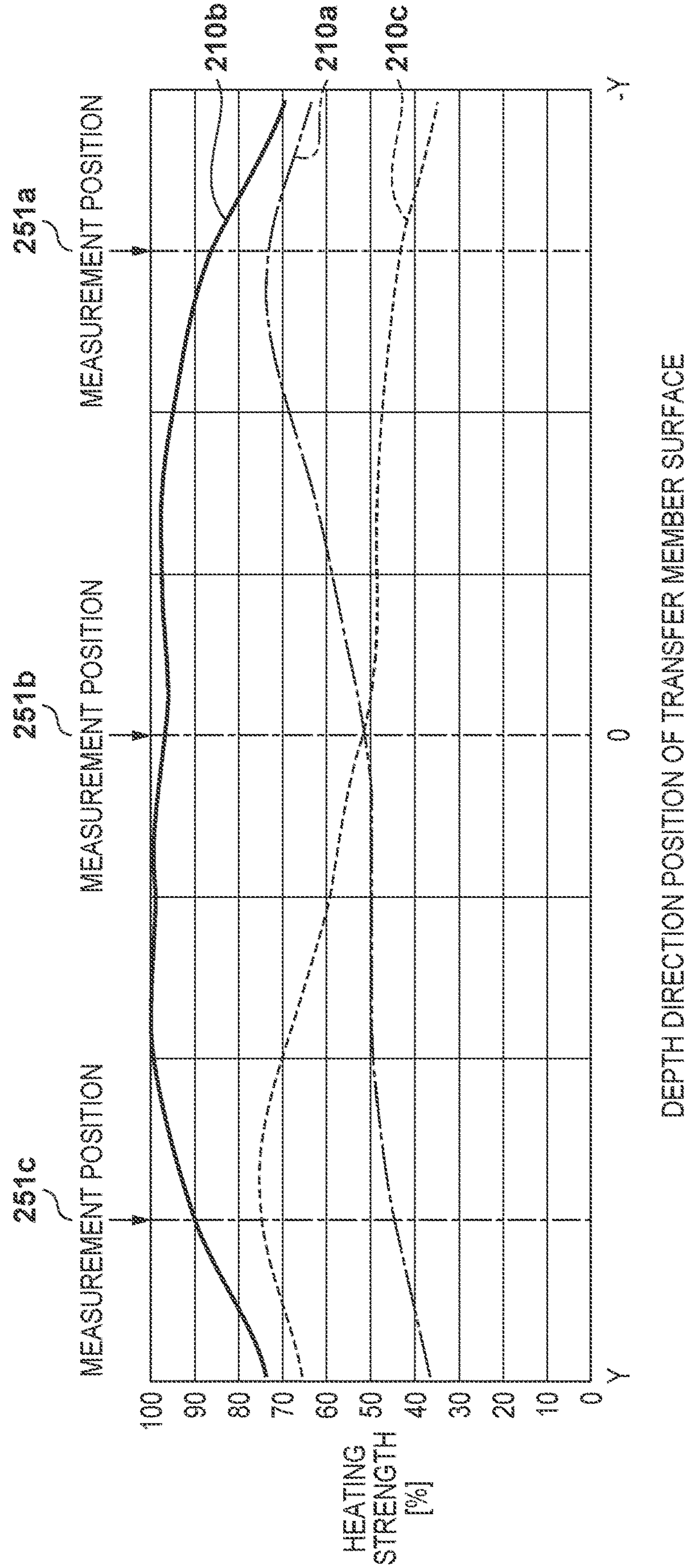
FIG. 11 is a graph showing the heating characteristics of temperature regulation areas of heaters.

FIG. 11 is a graph showing the heating characteristics of the heaters 210 in the depth direction of the transfer member 2 (temperature regulation areas in the Y direction). The heaters 210*a* to 210*c* have different heating characteristics in the depth direction of the transfer member 2.

Each heater 210*b* contributes to heating in the whole depth direction so as to have a peak at the center of the transfer member 2. At the two end portions of each heater 210*b* in the depth direction, the heating strength is low due to the light emission characteristic of the infrared heater. The heater 210*a* contributes to heating so as to have a peak on the end side in the −Y direction of the depth direction of the transfer member 2. The heater 210*c* contributes to heating so as to have a peak on the end side in the +Y direction on the opposite side of the heater 210*a*. The heaters 210*a* and 210*c* complement the heating strength on the two end portions of each heater 210*b*. The heater 210*a* and temperature sensors 251*a* to 251*c* are provided at positions where temperatures corresponding to the peak areas of the heaters 210*a* to 210*c* can be detected. Note that the heating characteristics of this embodiment are merely examples, and the amplitude and shape of the heating strength (function or operation) are not limited to them.

With this arrangement, in the transfer member 2, the heaters 210*b* mainly heat the entire central portion in the depth direction (Y direction) of the transfer member from the upstream side in the rotation direction (the −Z direction in FIG. 10). Then, the heaters 210*a* and 210*c* mainly heat the two end portions in the depth direction of the transfer member.

Figure 12:
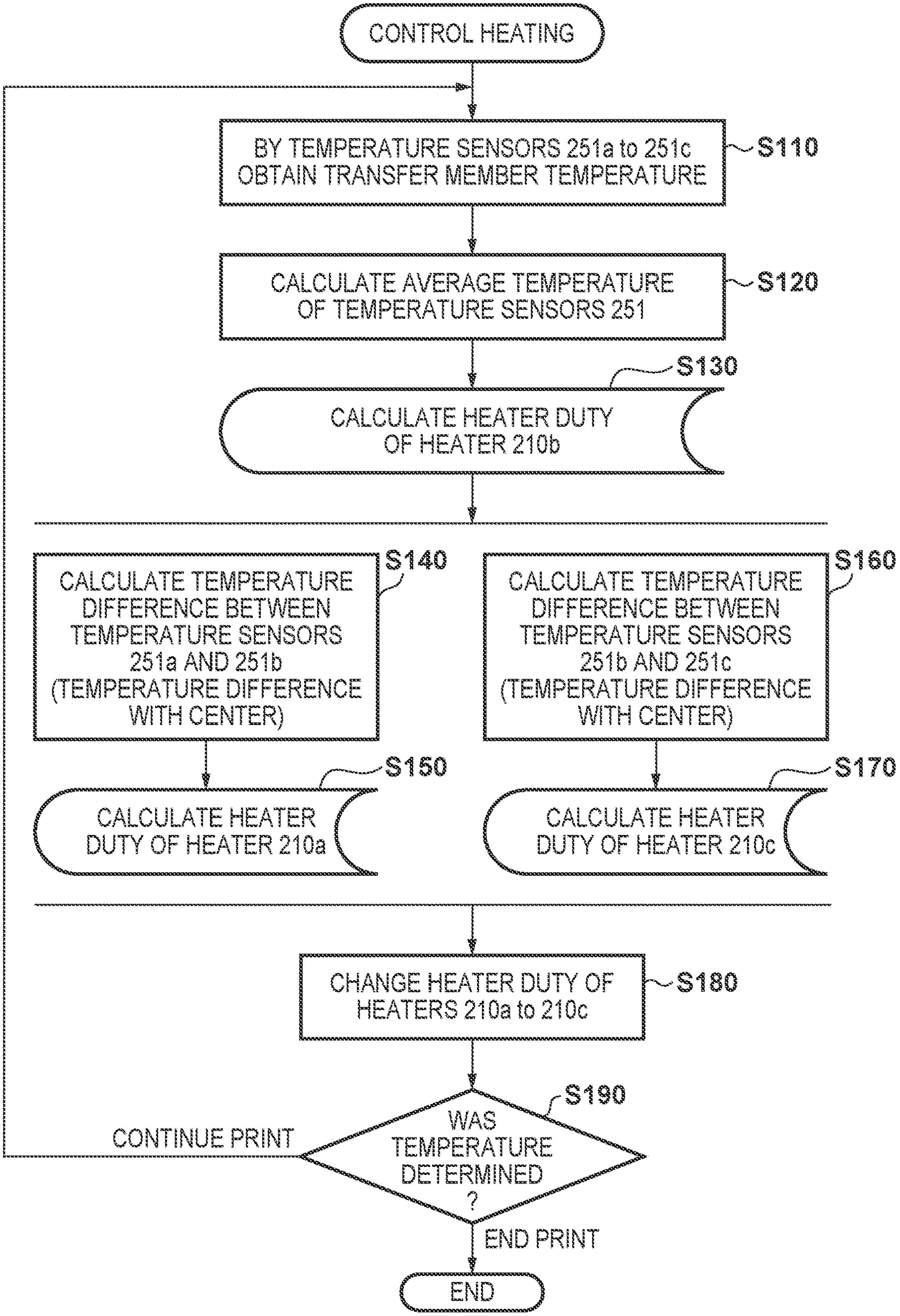
FIG. 12 is a flowchart illustrating heating control of the transfer member based on temperatures detected by temperature sensors.

FIG. 12 is a flowchart illustrating an example of a method of controlling heating of the transfer member 2 based on the temperatures (detected temperatures) detected by the temperature sensors 251.

In step S110, during a printing operation, the temperature sensors 251*a* to 251*c* each measure the temperature of the transfer member 2 on the downstream side of the heating unit 5D in the rotation direction of the transfer member 2, thereby acquiring them.

In step S120, the average value (average temperature) of the temperatures acquired by the temperature sensors 251*a* to 251*c* is calculated.

In step S130, the heater duty (duty) of the heater 210*b* of the heating unit 5D is calculated based on the difference between the calculated temperature and a target temperature. In general, since as the duty is larger, the heating capability is larger, the duty is calculated to be a larger value as the temperature of the transfer member 2 is lower.

Note that in the embodiment, heating is performed by executing phase control of the power of the heater 210 incorporated in the heating unit 5D in accordance with the duty. Therefore, the heat generation amount of the heater 210 is increased by increasing the duty.

In steps S140 to S170, the duties of the heaters 210*a* and 210*c* are calculated. In step S140, the temperature difference between the temperature sensors 251*a* and 251*b* is calculated. In step S150, the duty of the heater 210*a* is calculated based on the temperature difference and the duty calculated in step S130. Similarly, in step S160, the temperature difference between the temperature sensors 251*b* and 251*c* is calculated. In step S170, the duty of the heater 210*c* is calculated based on the temperature difference and the duty calculated in step S130.

In the embodiment, the temperature difference between the temperature sensor 251*b* located at the center of the transfer member 2 and each temperature sensor corresponding to the depth direction of the transfer member 2 is calculated, and the duty of the heater 210 having the corresponding heating characteristic is calculated. Therefore, as the temperature in the area of the temperature sensor 251*a* is lower than in the central portion, the heat generation amount of the heater 210*b* is larger. Similarly, as the temperature in the area of the temperature sensor 251*c* is lower than in the central portion, the heat generation amount of the heater 210*c* is larger. Furthermore, if each temperature difference is small, the duty based on the average temperature calculated in step S130 predominantly acts on the heat generation amount.

In step S180, the calculated duty is compared with the current duty, and if the current duty needs to be changed, the current duty is changed to the calculated duty.

In step S190, it is determined whether the temperature when the transfer member 2 passes through the transfer area R6 falls within the above-described temperature range. If the detected temperature falls within the predetermined temperature range, it is determined to be able to continue the printing operation, and the process returns to step S110; otherwise (the detected temperature falls outside the temperature range) or if a printing end instruction is issued, the printing operation is stopped.

According to this embodiment, the heat generation amount of the heater 210 corresponding to the depth direction (Y direction) among the heaters 210 juxtaposed in the rotation direction of the transfer member 2 is controlled based on the temperatures measured by the plurality of temperature sensors 251 provided in the depth direction of the transfer member 2. With this arrangement, the in-plane temperature of the surface of the transfer member 2 is maintained to fall within an appropriate range, and the transferability of the transfer member 2 is thus appropriate. By complementarily performing heating control of the heater 210 having a plurality of heating ranges, it is possible to suppress the number of control systems, that is, it is possible to readily relatively change the number of heaters 210 and their heat generation amounts.

<Cooling Unit>

Although details will be described later with reference to FIGS. 13 to 16, the cooling unit is formed by contact rollers that contact the transfer member 2 of the cleaning unit 5E and an air blowing mechanism that blows air to the transfer member 2.

The cooling unit included in the cleaning unit 5E is formed by an air blowing mechanism 320 and rotatable contact rollers 301 and 302 that contact the transfer member 2 to perform cleaning.

The contact pressures of the contact rollers 301 and 302 are controlled by a contact control mechanism (not shown), and a predetermined contact width is ensured by the contact control. The roller surface temperatures of the contact rollers 301 and 302 are controlled by a temperature control arrangement (to be described later). The above-described contact control and temperature control perform cooling by conductive heat transmission with the transfer member 2.

Figure 13:
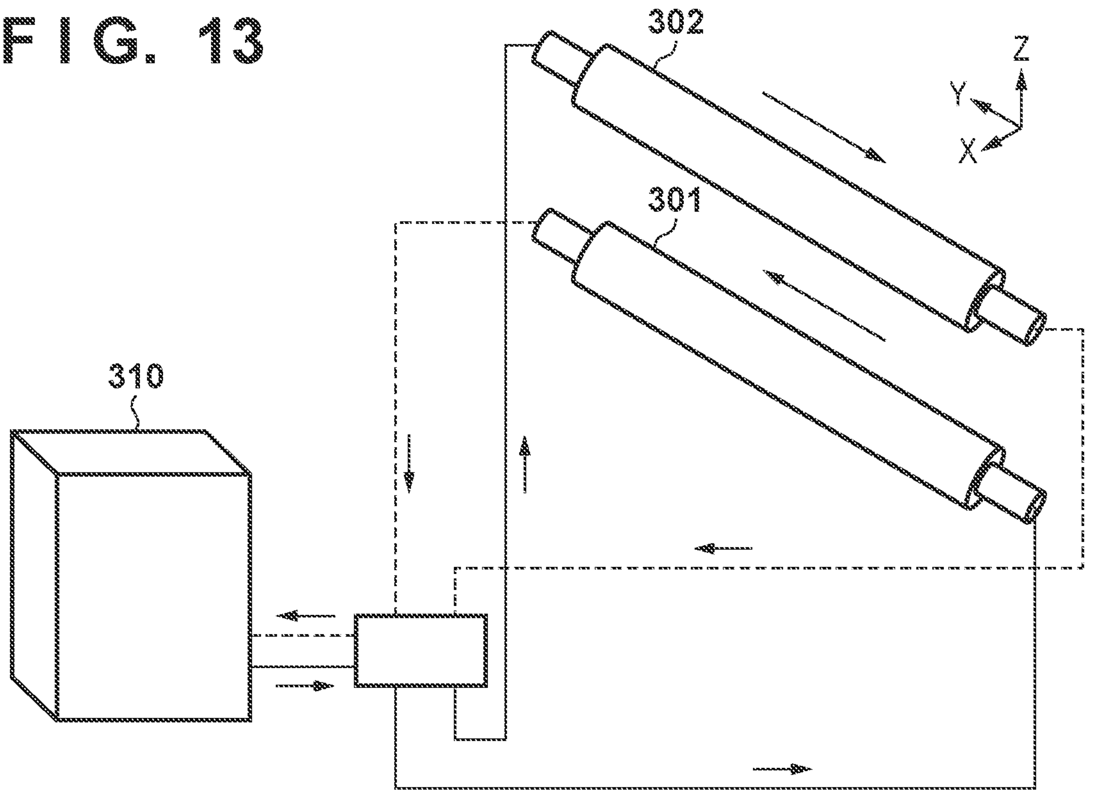
FIG. 13 is a view schematically showing the temperature control arrangement of contact rollers.

FIG. 13 schematically shows the temperature control arrangement of the contact rollers 301 and 302. Each of the contact rollers 301 and 302 is a hollow metal roller in which water cooled to a predetermined temperature is circulated by a cooling water circulation apparatus 310. In this embodiment, cooling water is regulated to 25° C. or lower. The temperature of cooling water rises by absorbing heat while passing through the rollers by heat exchange between the metal rollers and cooling water. To suppress the deviation of the surface temperature between the plurality of rollers caused by a water temperature change, the cooling water circulation directions of the contact rollers 301 and 302 are made different from each other, as shown in FIG. 13.

Figure 14:
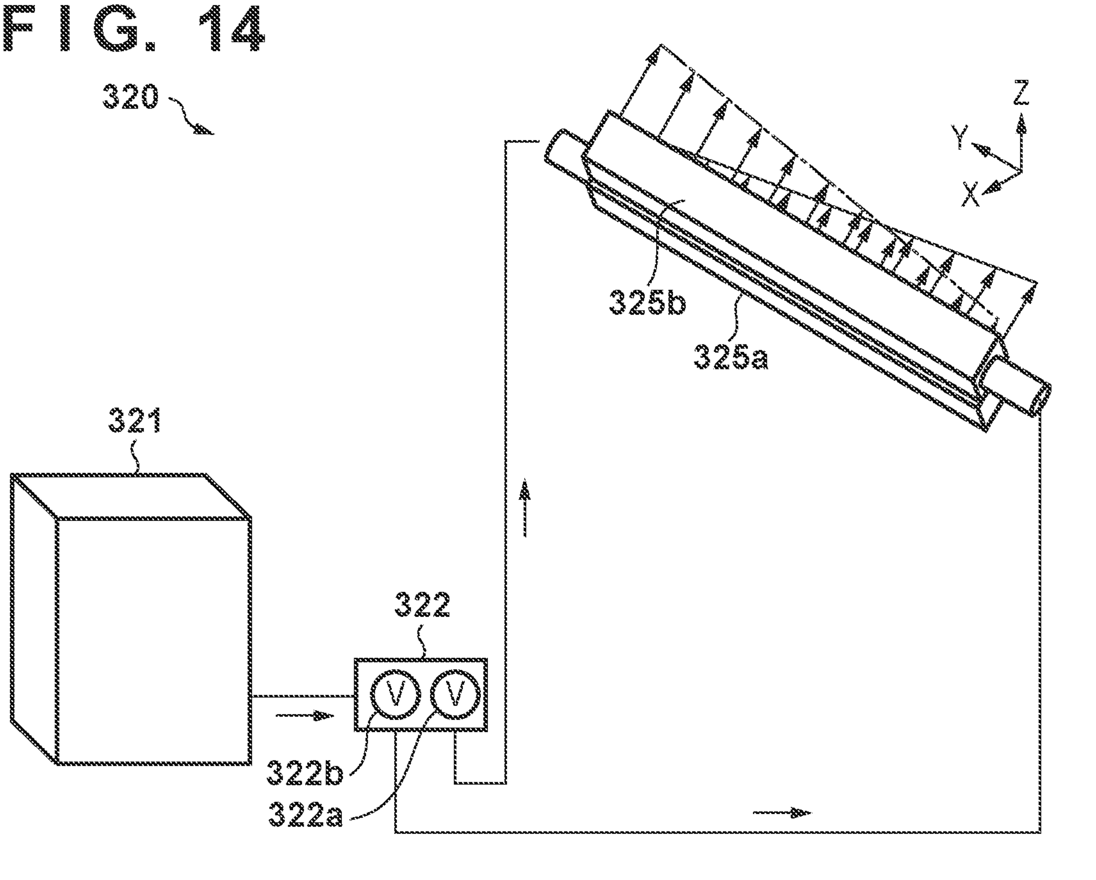
FIG. 14 is a schematic view showing components of an air blowing mechanism.

FIG. 14 schematically shows the air blowing amount control arrangement of the air blowing mechanism 320. The air blowing mechanism 320 is arranged on the downstream side of the contact roller 301 in the rotation direction of the transfer member 2. A blower 321 supplies air to a blowing port 325 via a regulating valve 322, thereby sending or jetting air to the transfer member 2. In the embodiment, an air nozzle can be used as the air blowing mechanism 320, and a high-pressure blower can be used as the blower 321. The regulating valve 322 can be regulated to an arbitrary opening of 0 (full close) to 100% (full open), and the flow rate of air supplied to the blowing port 325 can be regulated by making the opening of the regulating valve 322 variable. As the blowing port 325, a plurality of blowing ports (two in this example, which are blowing ports 325*a* and 325*b*) are provided. The regulating valve 322 includes a regulating valve 322*a* corresponding to the blowing port 325*a* and a regulating valve 322*b* corresponding to the blowing port 325*b*. The flow rate of air from each blowing port 325 is regulated by the regulating valve 322*a* or 322*b*.

Figure 15:
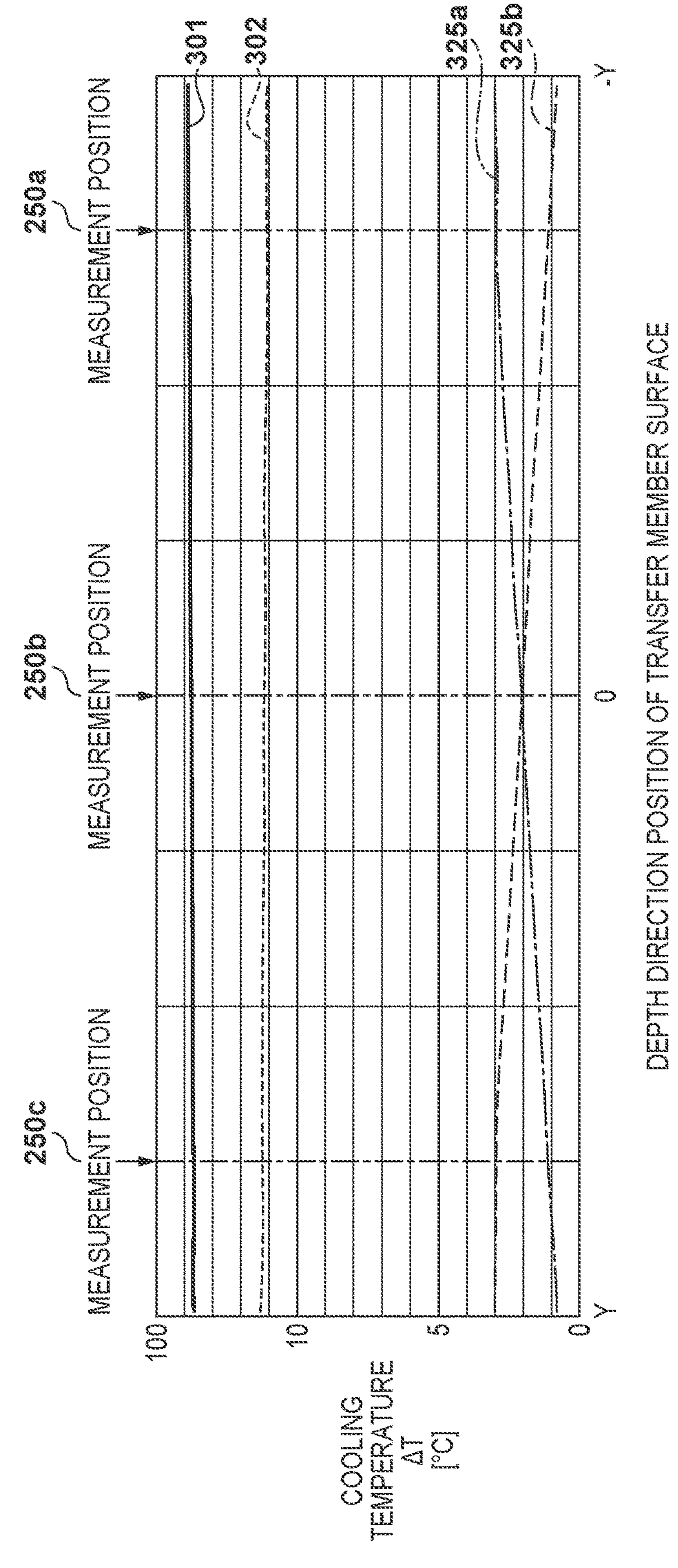
FIG. 15 is a graph showing the cooling characteristics of temperature regulation areas of a cooling unit.

FIG. 15 shows the cooling characteristics in the depth direction of the transfer member 2 of the cooling unit (temperature regulation areas in the Y direction). The temperature sensors 250*a* to 250*c* are provided at positions where temperatures corresponding to the central portion and the peak areas of the blowing ports 325*a* and 325*b* can be detected. Note that the cooling characteristics of this embodiment are merely examples, and the amplitude and shape of the cooling strength (function or operation) are not limited to them.

The contact rollers 301 and 302 cool the entire portion in the depth direction (Y direction) of the transfer member 2 from the upstream side in the rotation direction, and the two end portions in the depth direction of the transfer member 2 are mainly cooled by air from the blowing ports 325*a* and 325*b*. With respect to the surface temperature of the transfer member 2 after transfer, the print medium P absorbs heat, and thus the two end portions tend to have a temperature higher than that of the central portion in the depth direction of the transfer member 2. The blowing ports 325*a* and 325*b* are configured to complement cooling of the two end portions in the depth direction of the transfer member 2.

As another embodiment, the cooling unit may be configured to perform cooling using a liquid as a coolant, that is, may be configured to make the temperature regulation capability variable by changing the temperature of the liquid.

Figure 16:
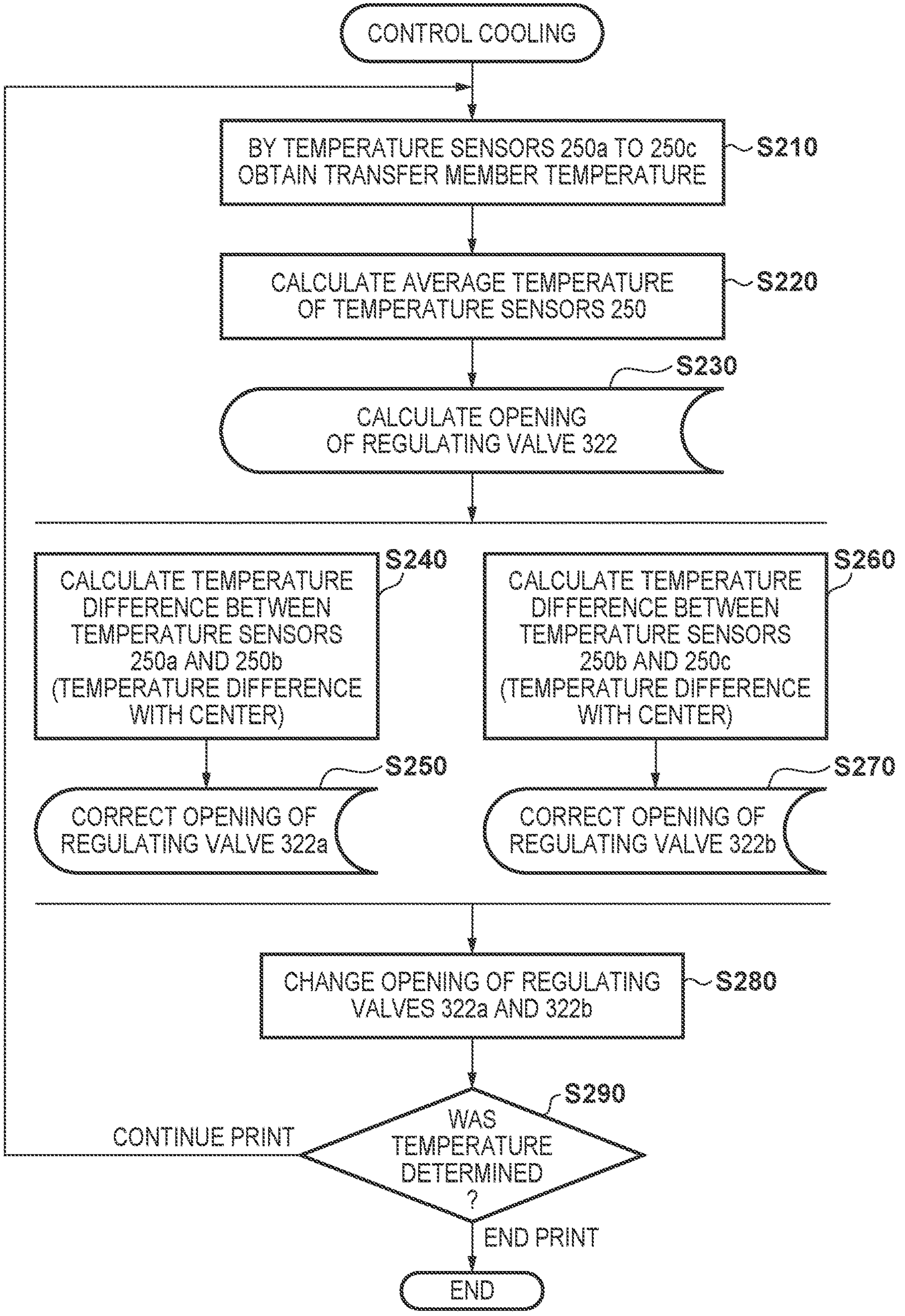
FIG. 16 is a flowchart illustrating cooling control of the transfer member based on temperatures detected by temperature sensors.

FIG. 16 is a flowchart illustrating cooling control of the transfer member 2 based on the temperatures detected by the temperature sensors 250.

In step S210, during a printing operation, the temperature sensors 250 each measure the temperature of the transfer member 2 on the downstream side of the reactive liquid application unit 5B in the rotation direction of the transfer member 2, thereby acquiring the measurement results.

In step S220, the average value (average temperature) of the temperatures is calculated based on the measurement results acquired by the temperature sensors 250*a* to 250*c*.

In step S230, the opening of the regulating valve 322 of the cleaning unit 5E is calculated based on the difference between the calculated temperature and a target temperature. In general, since as the opening of the regulating valve 322 is larger, the air quantity supplied to the blowing port 325 is larger, the opening is calculated to be a larger value as the temperature of the transfer member 2 is higher.

In steps S240 to S270, the openings of the regulating valves 322*a* and 322*b* are corrected. In step S240, the temperature difference between the temperature sensors 250*a* and 250*b* is calculated. In step S250, the opening of the regulating valve 322*a* is corrected based on the calculated temperature difference and the opening calculated in step S230. Similarly, in step S260, the temperature difference between the temperature sensors 250*b* and 250*c* is calculated. In step S270, the opening of the regulating valve 322*b* is corrected based on the calculated temperature difference and the opening calculated in step S230.

In the embodiment, the temperature difference between the temperature sensor 250*b* located in the central portion of the transfer member 2 and each temperature sensor corresponding to the depth direction of the transfer member 2 is calculated, and the flow rate of air supplied to the blowing port 325 having the corresponding cooling characteristic is calculated. Therefore, as the temperature in the area of the temperature sensor 250*a* is lower than in the central portion (lower than that of the temperature sensor 250*b*), the flow rate of air jetted from the blowing port 325*a* is larger. Similarly, as the temperature in the area of the temperature sensor 250*c* is lower than in the central portion, the flow rate of air jetted from the blowing port 325*b* is larger. Furthermore, if each temperature difference is small, the opening calculated in step S230 predominantly acts on the flow rate of air.

In step S280, the calculated opening is compared with the current opening, and if the current opening needs to be changed, the current opening is changed to the calculated opening.

In step S290, it is determined whether the temperature when the transfer member 2 passes through the discharge area R3 falls within the above-described temperature range. If the detected temperature falls within the predetermined temperature range, it is determined to be able to continue the printing operation, and the process returns to step S210; otherwise (the detected temperature falls outside the temperature range) or if a printing end instruction is issued, the printing operation is stopped.

According to this embodiment, the cooling amount of the cooling unit corresponding to the depth direction among the cooling units juxtaposed in the rotation direction of the transfer member 2 is controlled based on the temperatures measured by the plurality of temperature sensors 251 provided in the depth direction of the transfer member 2. With this arrangement, the in-plane temperature of the surface of the transfer member 2 is maintained to fall within an appropriate range, and the image formation stability of the transfer member 2 is thus appropriate. By suppressing the difference in in-plane temperature by the air blowing mechanism 320, it is possible to preferably maintain the wax application property of the wax application unit 5A located on the downstream side in the rotation direction of the transfer member 2 and the reactive liquid application property of the reactive liquid application unit 5B. Furthermore, by complementarily performing cooling control using a cooling unit having a plurality of cooling ranges, it is possible to suppress the number of control systems, that is, it is possible to readily relatively change the number of cooling units and their cooling amounts.

By performing temperature control of the transfer member 2 by the heating unit and the cooling unit with the arrangement shown in FIG. 8, the in-plane temperature of the surface of the transfer member 2 passing through the discharge area R3 and the transfer area R6 is maintained to fall within the appropriate range, thereby making it possible to appropriately maintain the stability of transferability and image formation. Furthermore, since the in-plane temperature of the surface of the transfer member 2 passing through the discharge area R3 is maintained to fall within the appropriate range, it is possible to suppress the in-plane difference in initial temperature of the transfer member 2 passing through the heating unit 5D. Therefore, in-plane temperature control of the surface of the transfer member 2 by heating of the heating unit 5D can be implemented within a shorter settling time. Similarly, the in-plane difference in initial temperature of the transfer member 2 passing through the cooling unit can be suppressed. Therefore, in-plane temperature control of the surface of the transfer member 2 by cooling of the cooling unit can be implemented within a shorter settling time.

Note that in the above-described embodiment, the arrangement for supporting the transfer member 2 by the transfer drum 41 has been explained but another arrangement can be adopted. For example, like the arrangement of the absorption unit 5C exemplified in FIG. 8, the arrangement for supporting the endless sheet-like transfer member 2 by a plurality of rotating members to be movable cyclically may be adopted.

Figure 17:
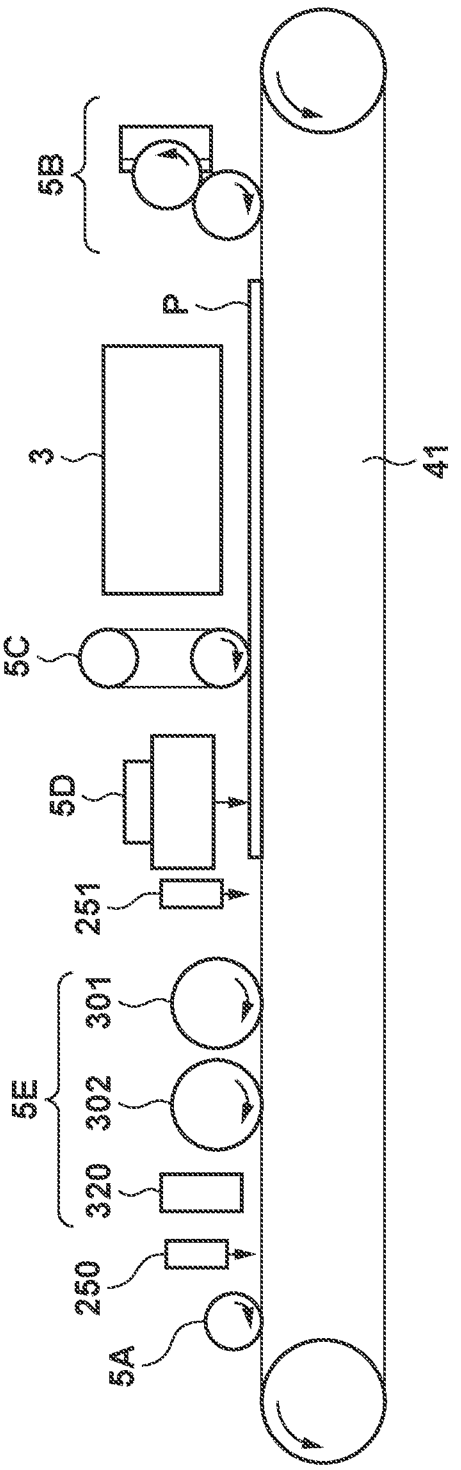
FIG. 17 is a schematic view showing another embodiment.

In the above-described embodiment, the arrangement for printing on the transfer member 2 has been explained but another printing arrangement may be adopted. An arrangement capable of directly implementing printing on the print medium P may be adopted. For example, an arrangement for printing on the print medium P without intervention of the transfer member 2, like an arrangement shown in FIG. 17, may be adopted.

<Program>

The present invention may be implemented by supplying a program for implementing one or more functions of the above-described embodiment to a system or apparatus via a network or storage medium and causing one or more processors in the computer of the system or apparatus to read out and execute the program. For example, the present invention may be implemented by a circuit (for example, an ASIC) which implements one or more functions.

<Others>

In the above description, the printing apparatus using the inkjet printing method has been described as an example. However, the printing method is not limited to this. Furthermore, the printing apparatus may be a single function printer having only a printing function or may be a multi-function printer having a plurality of functions such as a printing function, a FAX function, and a scanner function. In addition, the printing apparatus may be a manufacturing apparatus configured to manufacture, for example, a color filter, an electronic device, an optical device, a microstructure, or the like by a predetermined printing method.

Furthermore, "print" in this specification should be interpreted in a broader sense. Hence, the mode of "print" is irrespective of whether or not the target to be formed on a print medium is significant information such as a character or graphic pattern, and is also irrespective of whether the target is manifested in a way that can be perceived visually by humans.

"Print medium" should also be interpreted in a broader sense, like "print". Hence, the concept of "print medium" can include not only paper used in general but also any materials capable of receiving ink, including fabrics, plastic films, metals, glass, ceramics, resins, wood, and leathers.

"Ink" should also be interpreted in a broader sense, like "print". Hence, the concept of "ink" can include not only a liquid that is applied to a print medium to form an image, a design, a pattern, or the like but also an incidental liquid that can be provided to process a print medium or process ink (for example, coagulate or insolubilize color materials in ink applied to a print medium).

The name of each of the elements and functional units described in the above embodiment is expressed based on the main function in this specification but may be expressed based on the sub-function. Therefore, the present invention is not strictly limited to this (this expression can be replaced by a similar expression). To the same effect, a term "unit" may be replaced by "component or piece", "member", "structure", "assembly", "circuit or module", "means", or the like, or may be omitted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-153617, filed on Sep. 21, 2021, which is hereby incorporated by reference herein in its entirety.

What is claimed is:

1. A printing apparatus for applying ink to a target print medium to form an image by a print unit, comprising:
- a plurality of temperature regulation units juxtaposed in a conveyance direction of the target print medium and each configured to regulate a temperature of the target print medium;
- a plurality of measurement units each configured to measure the temperature of the target print medium regulated by each temperature regulation unit; and
- a control unit configured to make a temperature regulation capability of each temperature regulation unit variable,
- wherein each of the plurality of temperature regulation units has a temperature regulation area where temperature regulation of an area in a widthwise direction of the target print medium is performed,
- each of the plurality of measurement units measures the temperature in the widthwise direction of the target print medium, and
- the control unit controls the plurality of temperature regulation units based on the temperatures measured by the plurality of measurement units.

2. The apparatus according to claim 1, wherein among the temperature regulation areas, a second temperature regulation area located on an upstream side with respect to the conveyance direction is wider in an area corresponding to the widthwise direction than a first temperature regulation area located on a downstream side with respect to the conveyance direction.

3. The apparatus according to claim 1, wherein among the plurality of temperature regulation units, the temperature regulation unit located on an upstream side with respect to the conveyance direction has the temperature regulation capability higher than the temperature regulation capability of the temperature regulation unit located on a downstream side with respect to the conveyance direction.

4. The apparatus according to claim 1, wherein
- the temperature regulation areas of at least two temperature regulation units among the plurality of temperature regulation units overlap each other, and
- among the plurality of measurement units, at least one measurement unit measures a temperature of the overlapping temperature regulation areas.

5. The apparatus according to claim 1, wherein the control unit measures the temperature of the temperature regulation area by the plurality of measurement units, and makes the temperature regulation capability of the temperature regulation unit corresponding to the temperature regulation area variable.

6. The apparatus according to claim 1, wherein each of the plurality of temperature regulation units comprises a heating unit configured to heat the target print medium.

7. The apparatus according to claim 6, wherein
- the heating unit is formed by a heater, and
- the control unit makes the temperature regulation capability variable based on a heating characteristic of the heater.

8. The apparatus according to claim 1, wherein each of the plurality of temperature regulation units comprises a cooling unit configured to cool the target print medium.

9. The apparatus according to claim 8, wherein the cooling unit includes a contact cooling unit configured to perform cooling by contacting the target print medium.

10. The apparatus according to claim 8, wherein the cooling unit includes an air second cooling unit configured to jet air by an air blowing unit.

11. The apparatus according to claim 9, wherein the contact cooling unit is configured to perform cooling using a liquid as a coolant, and the control unit makes the temperature regulation capability variable by changing a temperature of the liquid.

12. The apparatus according to claim 10, wherein the control unit makes a temperature regulation capability of the air cooling unit variable by changing an air quantity supplied by the air blowing unit.

13. The apparatus according to claim 1, wherein the control unit controls the temperature regulation capability such that the temperature of the target print medium falls within a predetermined range.

14. The apparatus according to claim 1, wherein if the temperature of the target print medium falls outside a predetermined temperature range even while controlling the temperature regulation capability of the temperature regulation unit, the control unit stops a printing operation.

15. The apparatus according to claim 1, further comprising a transfer unit configured to transfer the image formed on the target print medium.

16. The apparatus according to claim 15, wherein the image is formed on the target print medium by cycling printing and transfer.

17. The apparatus according to claim 16, wherein the target print medium is a rotating member configured to rotate based on a predetermined rotation axis, and is configured so that a surface of the target print medium is cyclically movable on a circular orbit by the rotation, and the print unit, the plurality of temperature regulation units, and the plurality of measurement units are arranged along a rotation direction of the target print medium around the target print medium.

* * * * *